(12) United States Patent
Eto et al.

(10) Patent No.: US 9,070,376 B2
(45) Date of Patent: Jun. 30, 2015

(54) METHOD FOR EVALUATING INFORMATION REPRODUCTION PERFORMANCE, INFORMATION REPRODUCTION DEVICE, AND INFORMATION RECORDING MEDIUM

(71) Applicant: HITACHI-LG DATA STORAGE, INC., Tokyo (JP)

(72) Inventors: Soichiro Eto, Tokyo (JP); Yoshitaka Morimoto, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/100,359

(22) Filed: Dec. 9, 2013

(65) Prior Publication Data

US 2014/0160911 A1     Jun. 12, 2014

(30) Foreign Application Priority Data

Dec. 10, 2012     (JP) .................................. 2012-268953

(51) Int. Cl.
*G11B 7/005*     (2006.01)
*G11B 20/10*     (2006.01)
*G11B 20/24*     (2006.01)

(52) U.S. Cl.
CPC ............... *G11B 7/005* (2013.01); *G11B 20/24* (2013.01); *G11B 20/10305* (2013.01)

(58) Field of Classification Search
None
See application file for complete search history.

(56) References Cited

U.S. PATENT DOCUMENTS

2002/0154578 A1* 10/2002 Ishibashi et al. ........... 369/13.27
2003/0067998 A1     4/2003 Nakajima et al.
2008/0159104 A1*  7/2008 Miyashita et al. ......... 369/53.41
2010/0260025 A1   10/2010 Minemura et al.

FOREIGN PATENT DOCUMENTS

JP          2004-200868 A       7/2004

OTHER PUBLICATIONS

Yoshihisa Adachi et al., New Method for Adjusting Write Strategy Using Sequenced Amplitude margin, Japanese Journal of Applied Physics, 2006, pp. 1061-1065, vol. 45, No. 2B.
Fumihiko Yokogawa et al., Signal Processing for 15/27 GB Read-Only Disk System, Japanese Journal of Applied Physics, Feb. 2000, pp. 819-823, vol. 39, Part1, No. 2B.

* cited by examiner

*Primary Examiner* — Wayne Young
*Assistant Examiner* — Brian Butcher
(74) *Attorney, Agent, or Firm* — Baker Botts L.L.P.

(57) ABSTRACT

A method for evaluating a reproduction performance which reproduces a specific pattern recording signal to measure a reproduced signal noise, and calculates an evaluated value of a reproduction performance on the basis of a frequency characteristic of the measured reproduced signal noise.

12 Claims, 21 Drawing Sheets

FIG.4A-1    FIG.4B-1    FIG.4C-1
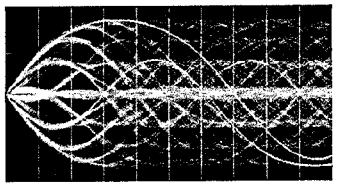 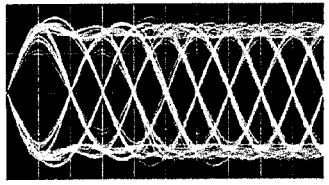 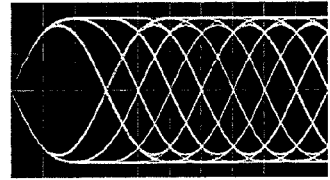
FIG.4A-2    FIG.4B-2    FIG.4C-2
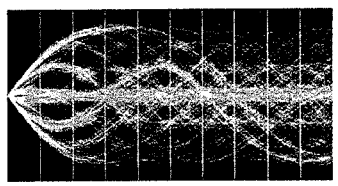 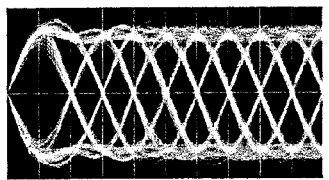 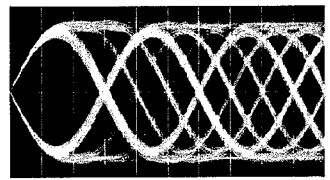

FIG.11A    FIG.11B    FIG.11C

| Name  | SER    |
|-------|--------|
| BD-1  | 4.0E-6 |
| BD-2  | 4.3E-6 |
| BD-3  | 5.5E-6 |
| BD-4  | 5.6E-6 |
| BD-5  | 2.0E-5 |
| BD-6  | 6.6E-5 |
| BD-7  | 9.8E-5 |
| BD-8  | 2.6E-4 |
| BD-9  | 7.7E-4 |
| BD-10 | 1.0E-3 |
| BD-11 | 4.1E-3 |
| BD-12 | 8.0E-3 |

| Name  | SER    |
|-------|--------|
| BD-21 | 5.1E-6 |
| BD-22 | 5.3E-6 |
| BD-23 | 6.1E-6 |
| BD-24 | 6.2E-6 |
| BD-25 | 2.2E-5 |
| BD-26 | 8.1E-5 |
| BD-27 | 1.2E-4 |
| BD-28 | 1.8E-4 |
| BD-29 | 5.6E-4 |
| BD-30 | 2.1E-3 |
| BD-31 | 3.3E-3 |
| BD-32 | 5.7E-3 |

| Name   | BER    |
|--------|--------|
| DVD-1  | 4.0E-7 |
| DVD-2  | 4.6E-7 |
| DVD-3  | 4.9E-7 |
| DVD-4  | 5.1E-7 |
| DVD-5  | 5.9E-6 |
| DVD-6  | 1.7E-5 |
| DVD-7  | 7.6E-5 |
| DVD-8  | 9.0E-5 |
| DVD-9  | 2.0E-4 |
| DVD-10 | 5.5E-4 |
| DVD-11 | 7.6E-4 |
| DVD-12 | 8.0E-4 |

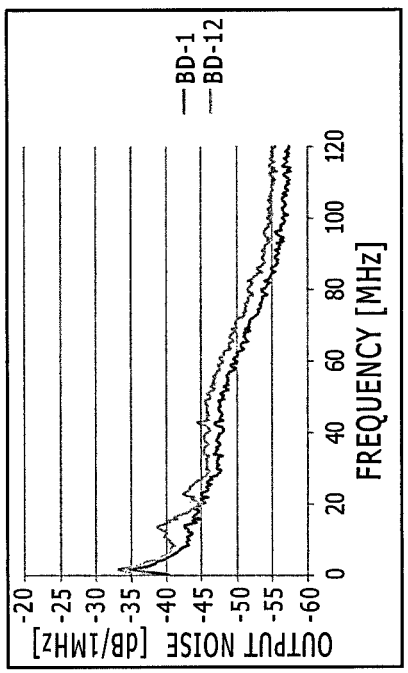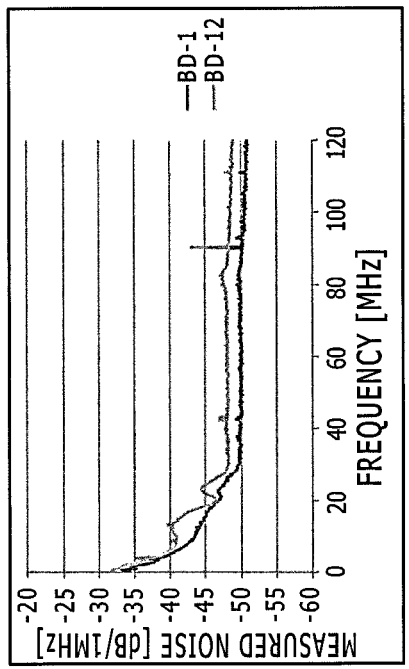
FIG. 15A
FIG. 15B

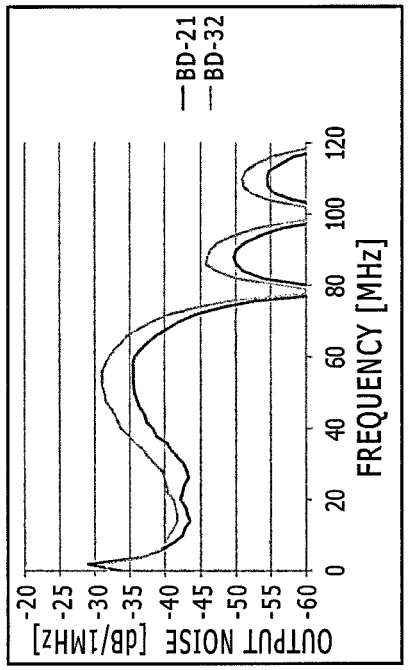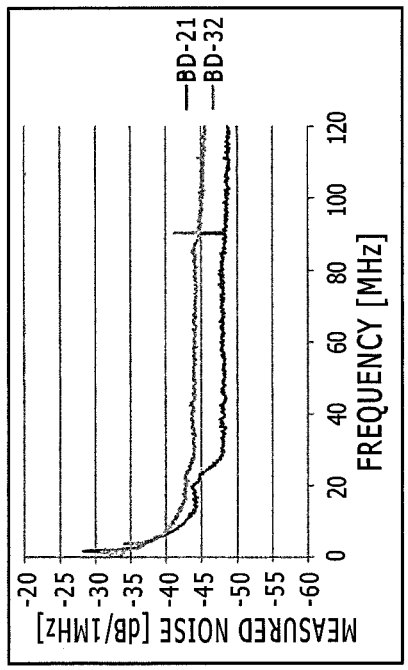
FIG. 18A
FIG. 18B

METHOD FOR EVALUATING INFORMATION REPRODUCTION PERFORMANCE, INFORMATION REPRODUCTION DEVICE, AND INFORMATION RECORDING MEDIUM

CROSS-REFERENCE TO RELATED APPLICATION

This application claims the priority of Japanese Patent Application No. 2012-268953 filed Dec. 10, 2012, which is incorporated herein by reference in its entirety.

BACKGROUND

The present invention relates to a method for evaluating reproduction performance, an information reproduction device, and an information recording medium in an optical information reproduction device that reproduces information by irradiating an optical information recording medium with a light.

Presently, as optical discs which are optical information recording medium, CD (compact Disc), DVD (Digital Versatile Disc), BD (Blu-ray Disc), and BDXL™ are commercialized, and extensively popularized. Those optical disc media have various kinds of a ROM (read only memory) type which is a read only type, an R (recordable) type which is a recordable type, and an RE (rewritable) type which is a rewritable type.

The recording and reading of information on the optical disc is conducted by irradiating the optical disc medium with a laser beam. The recording of the information is conducted by forming a region in which a state of a recording film material is changed by heat of the laser beam. The region in which this state has been changed is called "mark", and the region in which the state has not been changed is called "space". A signal is recorded on a recording layer by combination of the mark and the space. In order to realize such recording, a phase change material, an organic dye, or an alloy or oxide made of an inorganic material is used. In reproduction of the information, the recording layer on which signals have been recorded is irradiated with a laser beam lower than a recording power, and a recording signal is read on the basis of a difference in the amount of reflected light between the mark and the space.

Because the optical disc is a medium commutative storage, the combination of the optical disc medium and the optical disc device is frequently changed. For that reason, the optical disc device adjusts the recording and reproduction according to the present combination. For example, the optical disc device adjusts a recording power and a light emission waveform used in the recording according to the medium in the recording. Also, in order to put the optical spot at the time of recording and reproduction in an optimum state, an objective lens, a collimator lens, or a lens tilt is also adjusted.

In the optical disc, in order to implement those adjustments, various indexes for evaluating a reproduced signal quality have been proposed. As the general indexes, there are SER (Symbol Error Rate), BER (Byte Error Rate), and bER (bit Error Rate), and those indexes are error probabilities of the symbol, byte, and bit. Also, there is a Jitter which is an index for evaluating a temporal fluctuation amount of the signal relative to a reproduction clock. A large number of evaluation indexes based on the reproduced signal processing system of the optical disc different from the above general indexes have been proposed. For the BD, Japanese Journal of Applied Physics Vol. 39, 2000, pp. 819-823 discloses a limit equalizer jitter, and Japanese Journal of Applied Physics Vol. 45, No. 2B, 2006, pp. 1061-1065 discloses a SAM (sequenced amplitude margin). The limit equalizer jitter is a jitter in results of processing the reproduced signal by a limit equalizer used in the reproduced signal processing. The SAM is an index for evaluating an errorless likelihood of the reproduced signal waveform on the basis of a target signal waveform and an error signal waveform in a case where reproduced signal processing of a PRML (partial response maximum likelihood) is applied to the BD. Also, for BDXL™, US2010/0260025 discloses i-MLSE (integrated-maximum likelihood sequence error estimation), Japanese Unexamined Patent Application Publication No. 2004-200868 discloses an L-SEAT (run-length-Limited Sequence Error for Adaptive Target). The i-MLSE and L-SEAT are indexes obtained by quantifying a distribution of the amount of error of the reproduced signal waveform relative to the target signal waveform by a standard deviation. In the optical disc, those indexes are used to evaluate the reproduced signal quality, and implement adjustment at the time of recording and reproduction.

SUMMARY

In order to surely ensure user data of an optical disc, it is essential to always keep the reproduced signal quality excellent.

However, when the combination of the optical disc medium and the optical disc device is changed, if both of the signal quality of the medium and the reproduction performance of the device are low, the reproduced signal quality is degraded. Also, even when the signal quality of the medium is not changed, the signal quality of the medium and the reproduction performance of the device are degraded with time to degrade the reproduced signal quality.

In order to avoid the read failure of user data by deterioration of the reproduced signal quality, there is first a need to ensure that the device can reproduce an assumed signal quality by evaluating the reproduction performance of the device. Further, there is a need to ensure whether the signal quality is an assumed quality, or not, by evaluating the signal quality of the medium. In particular, when the signal quality is degraded with time, because there is a need to migrate data before data of the medium cannot be read without depending on the reproduction performance of the device, there is a need to accurately evaluate the signal quality at that time.

The evaluation of the reproduction performance can be implemented by using the reproduced signal quality for the same evaluation medium. However, it is difficult to reproduce the same evaluation medium in all of the devices. Also, even when the degradation of the reproduction performance with time is evaluated, the above evaluation medium is necessary. Therefore, it is impossible to implement this evaluation method. On the other hand, the signal quality can be evaluated with the reproduced signal quality for the same device. However, the device used for evaluation does not need to be identical, and needs to have the reproduction performance. For that reason, if the reproduction performance of the device can be evaluated, because plural devices having the equivalent reproduction performance can be prepared, the evaluation of the signal quality can be realized.

From the above viewpoint, in order to ensure the reproduction performance of the optical disc device and the signal quality of the optical disc medium for always keeping the reproduced signal quality excellent, the evaluation of the reproduction performance is essential.

The above problem is addressed by using a method for evaluating the reproduction performance which reproduces a recording signal of a specific pattern to measure a reproduced signal noise, and calculates an evaluated value of the reproduction performance on the basis of a frequency characteristic of the measured reproduced signal noise.

In this method for evaluating the reproduction performance, a signal for measuring the signal intensity and a signal for reproducing noise at the time of reproduction are used for the signal of the specific pattern. For example, a random pattern is used as a measurement signal of the signal intensity, a pure tone (repetitive pattern of marks and spaces having the same signal length) is used in a reproduction track as a signal for reproducing the noise at the time of reproduction, and a pattern in which signals are present at random is used in adjacent tracks. In this example, it is desirable that the signal length used in the pure tone is lower than an optical resolution. Also, the signal of the reproduction track is not only the pure tone, but also a linear signal (DC recording signal). In this case, the DC recording signal is adjusted so that a mean reflected light amount when the DC recording signal is reproduced becomes equal to that when the random signal is reproduced, and recorded.

In calculation of the evaluated value, the noise is standardized by the signal intensity, and used for calculation. Specifically, a frequency characteristic of a ratio of the noise to the signal intensity is calculated, and used for calculation of the evaluated value. The signal intensity to be used may be arbitrary, for example, a maximum amplitude of the random signal or an amplitude of a maximum signal length. However, it is desirable to use an amplitude of the signal length in which the signal amplitude is saturated. Also, the evaluated value is calculated by integrating the frequency characteristic of the noise. In particular, when a noise filter of a signal processing system to be used is determined, the evaluated value is calculated by integrating the frequency characteristic of a result of adding the noise filter to the frequency characteristic of the noise. In this example, the noise filter is a response function indicative of the amount of deterioration of the reproduced signal quality to the frequency and intensity of the noise included in the reproduced signal. Therefore, the frequency characteristic of the amount of deterioration of the reproduced signal quality is calculated by adding the noise filter to the frequency characteristic of the noise is calculated, and the evaluated value calculated as the integrated value corresponds to the amount of deterioration of the reproduced signal quality calculated as the integrated value.

The use of the method for evaluating the reproduction performance according to the present invention, can easily evaluate the reproduction performance of the optical disc device, and can also evaluate the signal quality of the optical disc medium accurately.

BRIEF DESCRIPTION OF THE DRAWINGS

FIG. 4A-1 is an exemplary diagram illustrating an eye pattern of an ideal signal in BDXL™;

FIG. 4B-1 is an exemplary diagram illustrating an eye pattern of an ideal signal in BD;

FIG. 4C-1 is an exemplary diagram illustrating an eye pattern of an ideal signal in DVD;

FIG. 4A-2 is an exemplary diagram illustrating an eye pattern of a random signal in which noise is added to the ideal signal in BDXL™;

FIG. 4B-2 is an exemplary diagram illustrating an eye pattern of a random signal in which noise is added to the ideal signal in BD;

FIG. 4C-2 is an exemplary diagram illustrating an eye pattern of a random signal in which noise is added to the ideal signal in DVD;

FIG. 11A is a table illustrating optical disc devices supporting BDXL™ used in the embodiment of the present invention, and the reproduction performances of the respective devices;

FIG. 11B is a table illustrating optical disc devices supporting a BD used in the embodiment of the present invention, and the reproduction performances of the respective devices;

FIG. 11C is a table illustrating optical disc devices supporting a DVD used in the embodiment of the present invention, and the reproduction performances of the respective devices;

FIG. 15A is an exemplary diagram illustrating a frequency characteristic of the noise obtained by adding a noise filter of the noise transmission characteristic to the measurement results of the NSR, intended for BDXL™;

FIG. 15B is an exemplary diagram illustrating a frequency characteristic of the noise obtained by adding the noise filter of the noise transmission characteristic to the frequency characteristic of the NSR, intended for BDXL™;

FIG. 18A is an exemplary diagram illustrating the frequency characteristic of the noise obtained by adding the noise filter of the noise transmission characteristic to the measurement results of the NSR, intended for the BD;

FIG. 18B is an exemplary diagram illustrating the frequency characteristic of the noise obtained by adding the noise filter of the noise transmission characteristic to the frequency characteristics of the NSR, intended for the BD;

DETAILED DESCRIPTION

Hereinafter, a method of evaluating the reproduction performance according to embodiments of the present invention will be described with reference to the accompanying drawings.

First Embodiment

Prior to a description of the present invention, a detail of this evaluation method will be described.

Figures 1A, 1B, 1C:
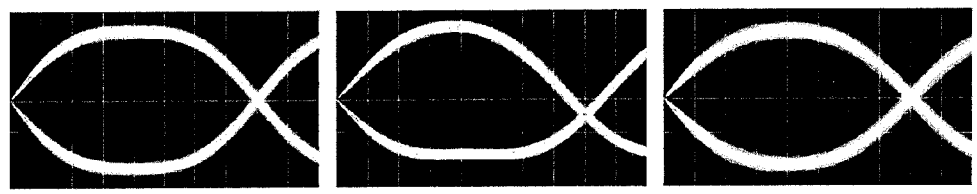
FIG. 1A is an exemplary diagram illustrating an eye pattern of an 8T pure tone signal when a signal excellent in signal quality is reproduced by a device excellent in reproduction performance.
FIG. 1B is an exemplary diagram illustrating the eye pattern of the 8T pure tone signal when a signal inferior in signal quality is reproduced by the device excellent in reproduction performance.
FIG. 1C is an exemplary diagram illustrating the eye pattern of the 8T pure tone signal when the signal excellent in signal quality is reproduced by a device inferior in reproduction performance.

First, eye patterns (superimposed signal) when signals excellent in signal quality and signals inferior in signal quality are reproduced on the same optical disc device are illustrated in FIGS. 1A and 1B. Also, an eye pattern when the signals of FIG. 1A are reproduced by a device inferior in reproduction performance is illustrated in FIG. 1C. Those signals are 8T pure tone signals in BDXL™. It can be confirmed that as compared with FIG. 1A, in FIG. 1B, the signal quality is low because sizes of a mark and a space are asymmetric, and in FIG. 1C, the reproduction performance is low because the amount of fluctuation of the signal is increased. As a result of measuring an NSR (noise to signal ratio) which is a value obtained by standardizing the amount of noise of those signals by the signal intensity, it is confirmed that the NSR is −26.6 dB in FIGS. 1A and 1B whereas the NSR is −23.8 dB in FIG. 1C, which is larger. From those results, it is found that the reproduction performance of the optical disc device can be evaluated by the NSR to the pure tone signal. This is because the deterioration of the signal quality mainly appears as a strain of the signal (FIG. 1B), but the amount of strain is detected in the evaluation index of the normal reproduced signal quality, but is not detected as the amount of noise. In the evaluation of this reproduction performance using this principle, the reproduction performance is evaluated using the NSR of the pure tone signal.

Figures 2A, 2B:
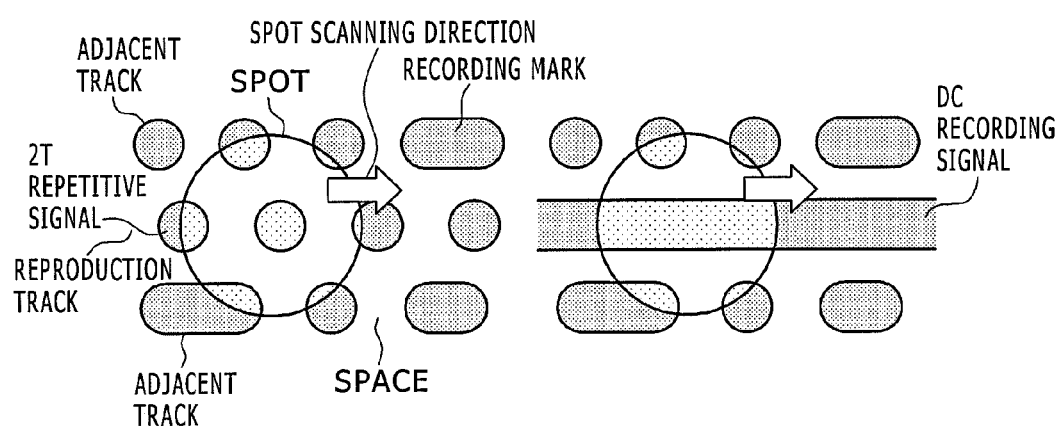
FIG. 2A is an exemplary diagram illustrating a signal pattern for measuring noise at the time of reproduction when a pure tone signal of a signal length equal to or lower than an optical resolution is recorded on a reproduction track.
FIG. 2B is an exemplary diagram illustrating a signal pattern for measuring noise at the time of reproduction when a DC recording signal is recorded on the reproduction track.
Figure 3:
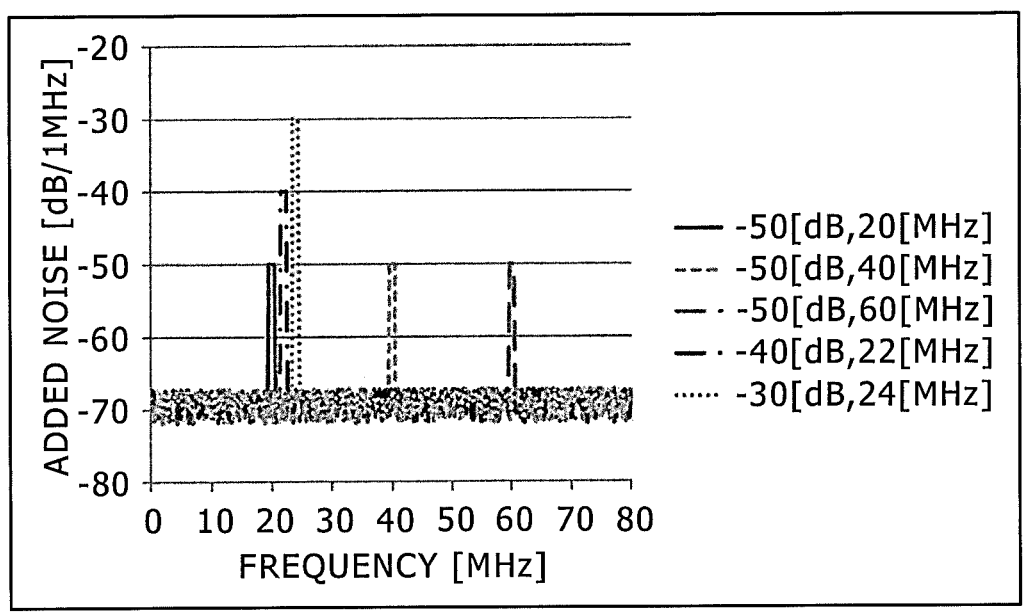
FIG. 3 is an exemplary diagram illustrating noise added to an ideal signal in the calculation of a noise filter.

As a signal used for the evaluation, the 8T pure tone signal in FIGS. 1A to 1C may be used. However, when this signal is used, there is required that the superimposed signal is calculated as illustrated in FIG. 1, and the amount of noise is calculated as the amount of fluctuation to a mean waveform of the superimposed signal. Therefore, in order to easily measure the NSR, it is desirable to measure the amount of noise and the signal intensity, separately. For example, the signal intensity is acquired as a signal amplitude of the random pattern. Also, taking a fact that a modulation code of the BDXL™ is 1-7 RLL, and the signal amplitude of an 8T signal which is a maximum signal length is saturated, and therefore has the same amplitude as that of the random signal into account, the signal intensity may be acquired as the signal amplitude of the 8T pure tone signal. On the other hand, the amount of noise is measured using a pattern of FIG. 2A or 2B. Those signals are patterns for recreating the noise at the time of reproduction, and a crosstalk noise is recreated with the existence of the random signal on the adjacent track. Also, a pattern that gives the same average signal level as that when the random signal is reproduced is recorded on the reproduction track, thereby recreating laser noise or disc noise at the time of reproduction. In this example, the signal of the reproduction track in FIG. 2A is a pure tone signal having a signal length lower than an optical resolution. As the pure tone signal, for example, a 2T signal having a shortest signal length which is lower than the optical resolution in BDXL™ may be used. As a result, because the signal intensity is not included in the measured noise, the amount of noise can be calculated without the calculation of the superimposed signal. Also, a linear mark (DC recording signal) is recorded on the reproduction track of FIG. 2B. Similarly, in this case, the amount of noise is easily calculated as in FIG. 2A. Which of the signals in FIGS. 2A and 2B is used may be determined on the basis of recording ease and servo stability in the device used for evaluation. FIGS. 2A and 2B illustrate examples in which the random signals are recorded on tracks adjacent to both sides of the reproduction track. However, the random signal may be recorded on only one adjacent track. The reproduction performance is evaluated on the basis of the measured NSR. As a simplest way, the reproduction performance may be evaluated with the calculated NSR as the evaluated value. However, in order to evaluate the reproduction performance with more precision, it is desirable to calculate the evaluated value taking an influence of the noise of the respective frequencies on the reproduced signal into account. In this case, the evaluated value is calculated using a response function (noise filter) indicative of the amount of deterioration of the reproduced signal quality by the noise of the respective frequencies. Specifically, a noise filter is added to the frequency characteristic of the NSR, and the frequency characteristic of the amount of deterioration of the reproduced signal quality resultantly obtained is integrated to calculate the evaluated value. In this example, the calculation of the noise filter is conducted by calculating the amount of deterioration of the reproduced signal quality when the noise localized in a specific frequency is added to an ideal signal. FIG. 3 illustrates an example of noise localized at 20, 40, and 60 MHz with the noise intensity of −50 dB, and noise with the noise intensity of −40 dB and −30 dB at 22 and 24 MHz. In FIG. 3, the noise to be added is localized in a range of 1 MHz, and the range of this frequency, the amount of fluctuation of the intensity, and a fluctuation interval may be determined according to a precision of the noise filter to be calculated. Examples of the ideal signal in BDXL™, BD, and DVD used for calculation of the noise filter are illustrated in FIGS. 4A-1, 4B-1, and 4C-1. Also, results of adding the localized noise to the respective ideal signals are illustrated in FIGS. 4A-2, 4B-2, and 4C-2. With the calculation of the reproduced signal quality of those signals, the amount of deterioration of the index value to the frequency and intensity of the added noise is calculated.

Figure 5B:
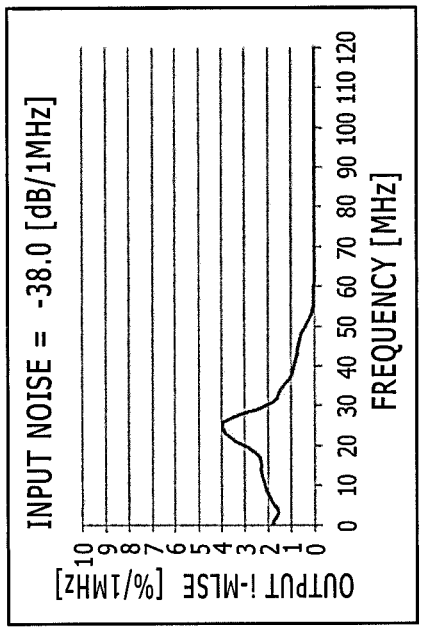
FIG. 5B is an exemplary diagram illustrating a frequency characteristic of an i-MLSE response to the noise intensity of −38 dB.
Figure 5A:
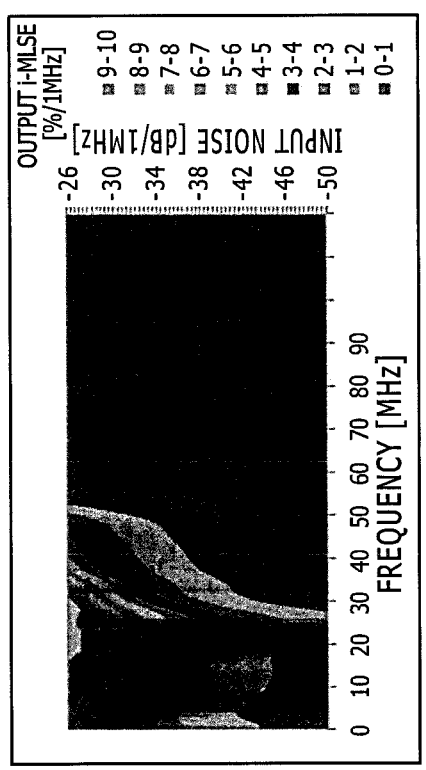
FIG. 5A is an exemplary diagram illustrating calculation results of an i-MLSE response to the frequency and intensity of the noise intended for BDXL™.

As a calculation example of the noise filter, the results when i-MLSE is used for the evaluation index of the reproduced signal quality, intended for BDXL™ are illustrated in FIGS. 5A and 5B. FIG. 5A illustrates results obtained by calculating an increment of i-MLSE to the noise frequency (1 MHz range) and the intensity. In FIG. 5A, the amount of i-MLSE generated has an axis in a direction perpendicular to a paper plane. The calculation is conducted assuming that 2× reproduction is conducted. In this example, an increment of i-MLSE is calculated from the following expression.

$$(i\text{-MLSE increment}) = \sqrt{(i\text{-MLSEnoiseadded})^2 - (i\text{-MLSEidealsignal})^2} \quad \text{Expression 1}$$

FIG. 5B illustrates the frequency characteristic of i-MLSE in the noise intensity −38 dB. From this frequency characteristic, it can be confirmed that the reproduced signal of BDXL™ is remarkably deteriorated by the noise of 20 to 30 MHz. This suggests that the noise management of the frequencies (repetitive signal) of 3T to 2T is important for prevention of the reproduction performance from being deteriorated. When a noise filter of the i-MLSE in FIGS. 5A and 5B is used, the calculation of the evaluated value is as follows.

$$\text{Evaluated value} = \sqrt{\int \Delta i\text{-MLSE}(f)^2} \quad \text{Expression 2}$$

Figure 6B:
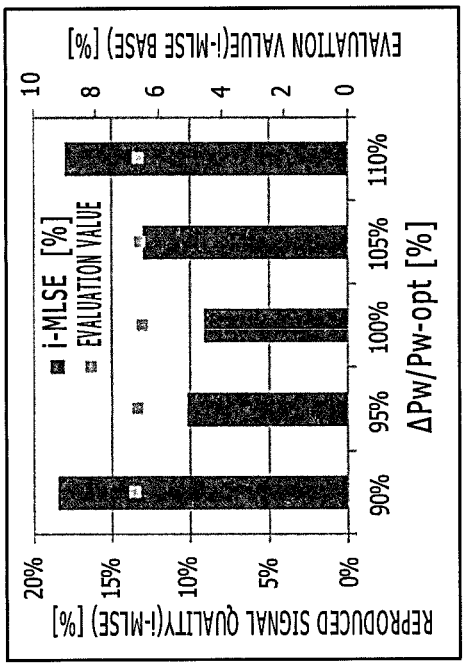
FIG. 6B is an exemplary diagram illustrating a change in evaluation index of the reproduction performance to the deterioration of the signal quality when the noise filter of the i-MLSE response is used, intended for BDXL™.
Figure 6A:
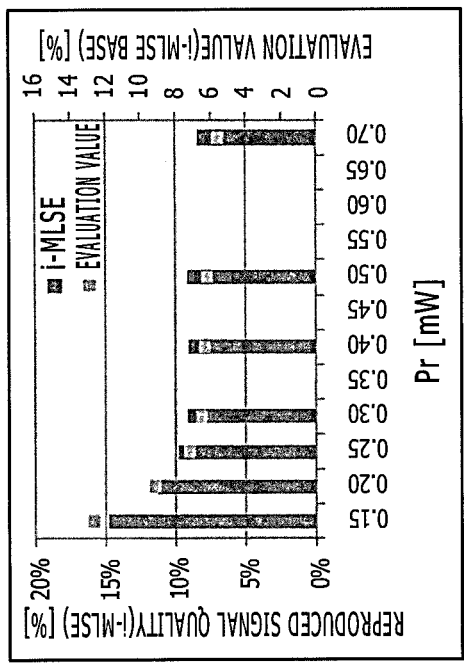
FIG. 6A is an exemplary diagram illustrating a change in evaluation index of the reproduction performance to the deterioration of the reproduction performance when the noise filter of the i-MLSE response is used, intended for BDXL™.

In this expression, f is a frequency, and $\Delta i\text{-MLSE}(f)$ is an i-MLSE increment in the respective frequencies. Examples in which the reproduction performance and the signal quality are evaluated using the evaluated value thus calculated are illustrated in FIGS. 6A and 6B. The evaluation of the reproduction performance is conducted by changing a reproduction power for the same signal (the signal quality is kept constant) to conduct the reproduction, and comparing the reproduced signal quality (i-MLSE) with the evaluated value in this situation. It can be confirmed from FIG. 6A that because the NSR of the reproduced signal is increased more as the reproduction power is decreased more, the reproduced signal quality is degraded, and the evaluated value is also increased in association with the degrading. From this fact, it is found that the reproduction performance can be accurately quantitatively evaluated using this evaluation index. The evaluation of the signal quality is conducted by comparing the reproduced signal quality when the recording signals (a change in the signal quality) of various recording powers are reproduced by the same device (the reproduction performance is kept constant) with the evaluated value. In FIG. 6B, the recording power in the axis of abscissa is represented by a ratio to an optimum recording power. It is found that the reproduced signal quality is degraded by shifting the recording power from 100%, but the evaluated value is kept substantially constant. From FIG. 6B, it can be confirmed that the reproduction performance can be quantitatively evaluated without being affected by the signal quality using this evaluation index.

Figure 7B:
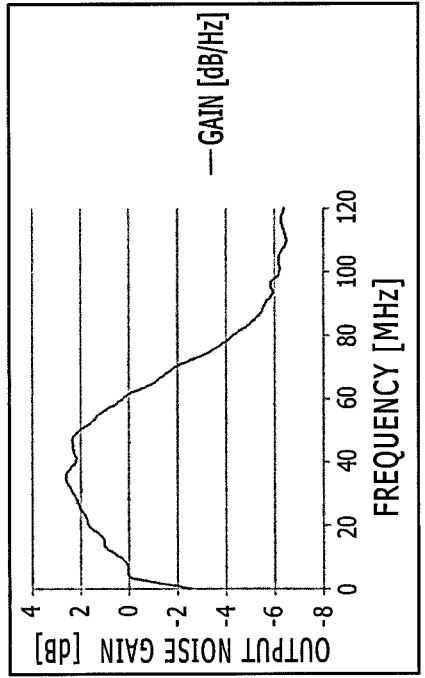
FIG. 7B is an exemplary diagram illustrating the frequency characteristic of the transmission characteristic intended for BDXL™.
Figure 7A:
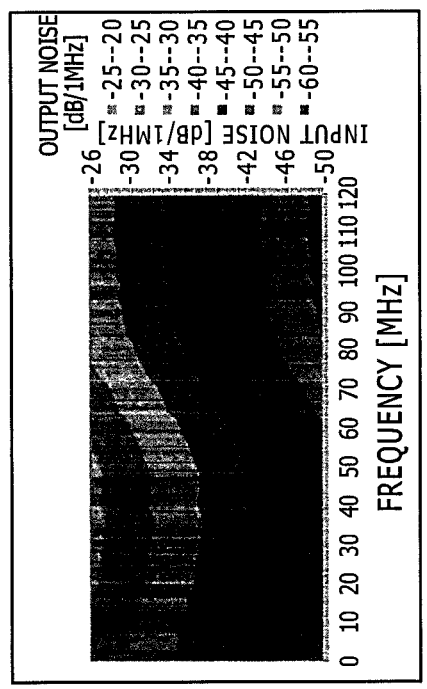
FIG. 7A is an exemplary diagram illustrating calculation results of a transmission characteristic to the frequency and intensity of the noise intended for BDXL™.

Different from the above configuration, there is a method in which the transmission characteristic of a reproduction processing system is used as the noise filter. For example, the results of measuring the transmission characteristic of an LPF (low pass filter), an HPF (high pass filter), or an equalizer in the reproduction processing system of BDXL™ are illustrated in FIG. 7A. As the transmission characteristics, it is found that the noise close to 40 MHz is amplified, and a cutoff frequency is about 70 MHz. Because the transmission characteristic does not depend on the input noise intensity, the noise filter is given as a gain to the frequency as illustrated in FIG. 7B. The calculation of the evaluated value when using the noise filter is given by the following expression.

$$\text{Evaluated value} = 10 \times \log 10 \left\{ \int 10^{\wedge} \left( \frac{(NSR(f) + g(f))}{10} \right) df \right\} \quad \text{Expression 3}$$

Figure 8A:
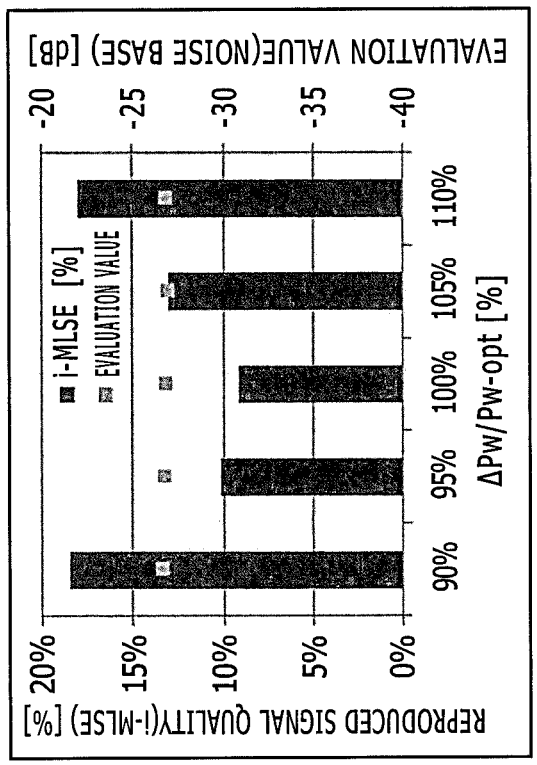
FIG. 8A is an exemplary diagram illustrating a change in evaluation index of the reproduction performance to the deterioration of the reproduction performance when the noise filter of the transmission characteristic is used, intended for BDXL™.
Figure 8B:
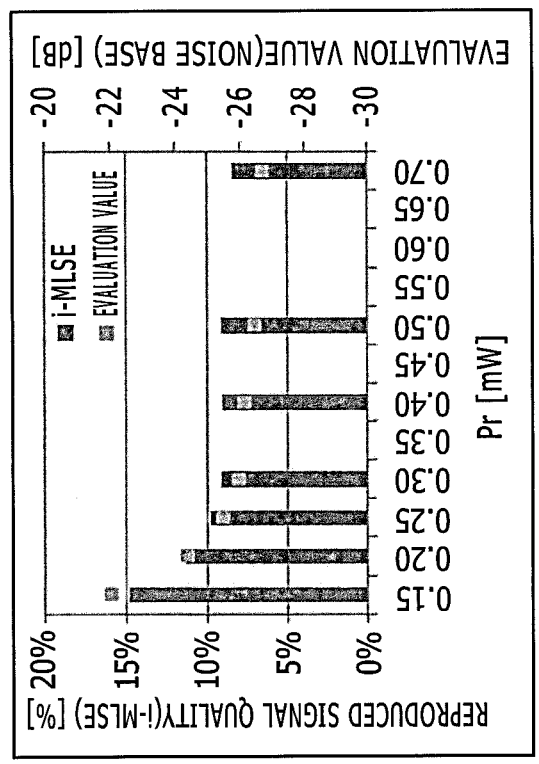
FIG. 8B is an exemplary diagram illustrating a change in evaluation index of the reproduction performance to the deterioration of the signal quality when the noise filter of the transmission characteristic is used, intended for BDXL™.

In this expression, f is a frequency, NSR(f) is input noise, and g(f) is a gain of a noise filter, and Expression 3 corresponds to the power addition of the noise of the respective frequencies. The results of evaluating the reproduction performance and the signal quality using the evaluated value as in FIG. 6 are illustrated in FIGS. 8A and 8B. The values of the evaluated value are different between FIGS. 8A, 8B, and FIGS. 6A, 6B, but the relationship between the evaluated value and the reproduced signal quality are substantially identical therebetween. Therefore, even if the transmission characteristic of the noise is the noise filter, it can be confirmed that the reproduction performance can be quantitatively evaluated with precision.

As described above, according to the present invention, there is provided the method of evaluating the reproduction performance, which calculates the noise filter of the optical disc device, records the signal pattern for recreating the noise at the time of reproduction, and the signal pattern for measuring the signal intensity, reproduces the recorded signal to calculate the NSR, calculates the frequency characteristic of the amount of deterioration of the reproduction performance quality using the frequency characteristic of the NSR and the noise filter, and integrates the calculated frequency characteristic to calculate the evaluated value of the reproduction performance.

In this case, because the present invention relates to a technique for evaluating the reproduction performance according to a correlation between the noise intensity and the signal intensity, the same evaluation of the reproduction performance as that described above can be conducted by measuring an index other than the NSR. For example, a difference of the reproduction performance in FIGS. 1A and 1C resides in that the reproduction performance can be evaluated even by the index obtained by standardizing the noise intensity by an area of a region surrounded by the superimposed signal in FIGS. 1A and 1C. In this case, the noise filter for the above index is determined to calculate the evaluated value of the reproduction performance according to the index obtained by standardizing the noise intensity by the area of the region surrounded by the superimposed signal. Also, when the correlation between the noise intensity and the signal intensity is specified by an axis in a time direction, the reproduction performance can be evaluated using a histogram of jitter in the time direction standardized by a channel clock. In this case, the noise filter is determined for the histogram of the above index, to thereby calculate the evaluated value of the reproduction performance according to the histogram of jitter in the time direction standardized by the channel clock.

Hereinafter, the optical disc device used for evaluation of the reproduction performance according to the present invention will be first described, and the method for evaluating the reproduction performance according to the present invention will be then described.

Figure 9:
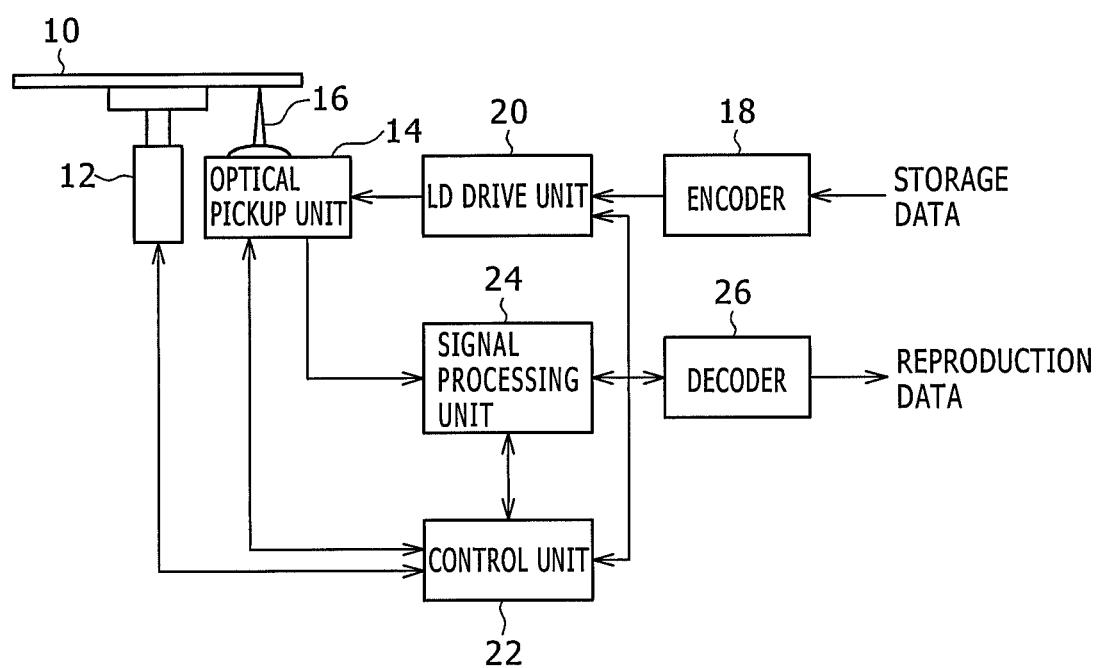
FIG. 9 is an exemplary block diagram illustrating a main configuration of an optical disc device according to an embodiment of the present invention.

FIG. 9 illustrates a configuration of an optical disc device used in an embodiment of the present invention. The optical disc device includes a spindle motor 12, an optical pickup unit 14, an encoder 18, an LD drive unit 20, a control unit 22, a signal processing unit 24, and a decoder 26 as a main configuration. The spindle motor 12 controls an optical disc 10 by a CLV (constant linear velocity) or CAV (constant angular velocity). The optical pickup unit 14 is disposed to face the optical disc 10, and emits a laser beam 16 having a recording power from a laser diode (LD) to record a signal on the optical disc 10, and emits the laser beam 16 having a reproduction power from the LD to read a recorded signal. Further, when the optical disc 10 is rewritable, the optical pickup unit 14 emits the laser beam 16 having an erase power (reproduction power<erase power<recording power) from the LD to erase the recorded signal.

When the signal is recorded, the recording data is encoded by the encoder 18, and supplied to the LD drive unit 20. The LD drive unit 20 determines a drive signal on the basis of the encoded recording waveform, supplies the drive signal to the LD within the optical pickup unit 14 to record the signal. A recording power value in the LD drive unit 20 is determined according to a control signal from the control unit 22. The control unit 22 conducts test write using plural kinds of recording powers in a test write region of the optical disc 10, and determines an optimum recording power on the basis of the test write signal. Further, the control unit 22 conducts the test write using plural kinds of recording waveforms, and also determines an optimum recording waveform on the basis of the test write signal.

On the other hand, at the time of data reproduction, the reproduced signal output from the optical pickup unit 14 is supplied to the signal processing unit 24. The signal processing unit 24 includes an RF amplifier, an equalizer, a binarization unit, and a PLL unit, and processes the reproduced signal by those components, and supplies the reproduced signal to the decoder 26. The decoder 26 decodes the signal on the basis of the binarized reproduced signal and a synchronizing clock reproduced by the PLL unit, and outputs the decoded signal as reproduction data. The signal processing unit 24 also calculates a reproduced signal quality of SER, BER, bER, Jitter, Limit Equalizer Jitter, i-MLSE, and L-SEAT. The reproduced signal and a reproduced signal quality index value of processing results in the signal processing unit 24 are also supplied to the control unit 22 for evaluation of the reproduced signal. Also, the control unit 22 also receives the reproduced signal from the optical pickup unit 14, measures an upper envelope and a lower envelope of the reproduced signal, measures signal amplitude, and measures noise. Then, the control unit 22 evaluates the reproduction performance on the basis of those numerical values. Also, the control unit 22 also generates a focus servo signal, a tracking control signal, a spindle motor control signal, and an LD drive control signal at the time of recording and reproduction. The optical pickup and the spindle motor are controlled on the basis of those signals, and those components are identical with the related art components. Therefore, their description will be omitted.

Figure 10:
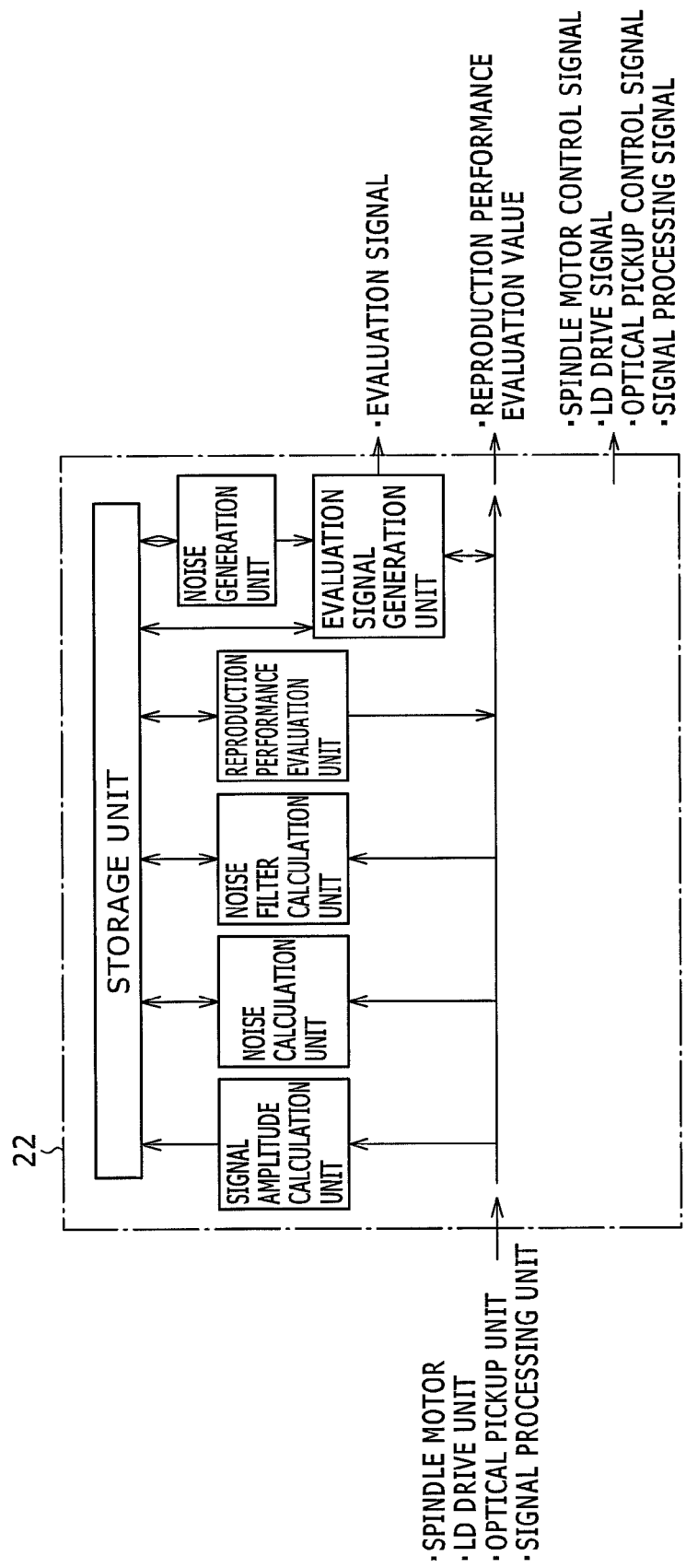
FIG. 10 is an exemplary block diagram illustrating a main configuration of a control unit in the optical disc device according to the embodiment of the present invention.

The control unit 22 includes, specifically, a CPU and a memory (ROM, RAM), and realizes various functions by combination of those components. For example, the control unit 22 has a function of calculating the signal amplitude and the noise according the reproduced signal, and evaluating the reproduction performance on the basis of the calculation results. A functional block of the control unit 22 in FIG. 9 is illustrated in FIG. 10.

The control unit 22 includes a signal amplitude calculation unit, a noise calculation unit, a noise filter calculation unit, a reproduction performance evaluation unit, a noise generation unit, an evaluation signal generation unit, and a storage unit. Using those functions, the control unit 22 generates and outputs signals such as reproduction performance evaluation and an evaluation signal according to input signals from the spindle motor, the LD drive unit, the optical pickup unit, and the signal processing unit. The signal amplitude calculation unit measures the signal amplitude of the reproduced signal, and stores the signal amplitude in the storage unit. The noise calculation unit conducts FFT (fast Fourier transform) on the reproduced signal to calculate the frequency characteristic of the noise, and stores the frequency characteristic in the storage unit. A method of calculating the noise frequency characteristic is not limited to FFT. If the same function as that of a spectrum analyzer is provided, the function is used to calculate the noise frequency characteristic. The noise generation unit generates the noise of an arbitrary frequency and intensity as in FIG. 3, and supplies the generated noise to the evaluation signal generation unit. The noise may be generated by adding an arbitrary bandpass filter to white noise, or may be generated by superimposing sine wave signals having a given frequency. In this situation, the frequency and intensity of the generated noise are stored in the storage unit. The evaluation signal generation unit generates and outputs an evaluation signal in which the noise is added to the ideal signal on the basis of information in the storage unit and the noise from the noise generation unit. The ideal waveform may be a target waveform based on a decode system of a target standard, or a reproduced signal excellent in the reproduced signal quality. Even when any ideal signal is used, the noise filter is calculated as a difference in the reproduced signal quality between the ideal signal and the signal to which the noise is added. Therefore, the results are substantially equivalent to each other. The evaluation signal generated in the control unit 22 is supplied to the signal processing unit 24, input to the control unit 22, and evaluated by the noise filter calculation unit. The noise filter calculation unit calculates a variation of the reproduced signal quality index before and after the noise is added, and saves the variation in association with the frequency and intensity of the noise added to the evaluation signal in the storage unit. When the noise filter calculation unit calculates the noise transmission characteristic in the signal processing unit 24 as the noise filter, the noise filter calculation unit does not generate the ideal waveform in the evaluation signal generation unit, and directly outputs the noise of the noise generation unit, and supplies the noise to the signal processing unit 24. After the supplied signal has passed through various filters used in the reproduced signal processing, the signal is input to the control unit 22. The noise frequency characteristic is calculated from the input reproduced signal by the noise calculation unit. In the noise filter calculation unit, the intensity of the noise generated in the noise generation unit, and the variation of the noise of the above frequency calculated in the noise calculation unit are stored in the storage unit together with the frequency. The noise filter calculation method using the signal processing unit 24 is described above. When the noise filter is stored in the storage unit of the control unit 22, there is no need to generate the noise filter in the noise generation unit, the evaluation signal generation unit, and the noise filter calculation unit. In the evaluation of the reproduction performance, the measured noise is processed by the noise calculation unit to store the noise frequency characteristic in the storage unit. In the reproduction performance evaluation unit, the evaluation index is calculated using, for example, Expressions 2 and 3, by using the frequency characteristic of a ratio (NSR) of the measured noise and signal intensity, and the calculated noise filter. The reproduction performance is evaluated and output.

Subsequently, optical disc devices having the above-mentioned configuration are prepared, and the results of implementing the reproduction performance evaluations of the respective devices will be described.

In this embodiment and the subsequent embodiment, the devices illustrated in FIGS. 11A to 11C are used. FIG. 11A illustrates a device supporting BDXL™ in which the reproduction performance is evaluated in this embodiment, and FIGS. 11B and 11C illustrate devices supporting a BD and a DVD used in the subsequent embodiment. The respective devices of FIGS. 11A, 11B, and 11C reproduce the same signal for evaluating the reproduction performance in advance, and the respective reproduced signal qualities are described. In this example, the respective devices are arranged in descending order of the reproduction performance.

Figure 12:
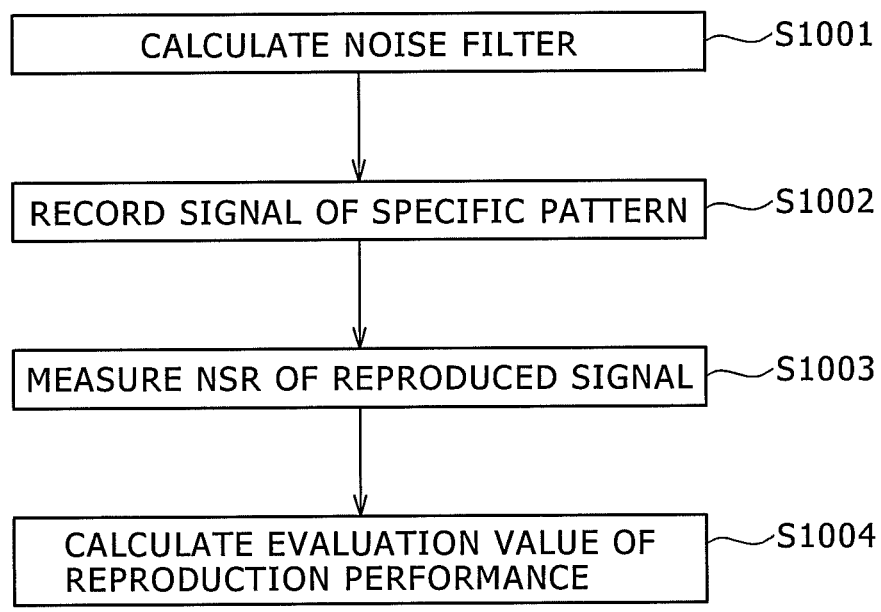
FIG. 12 is an exemplary flowchart illustrating a procedure of evaluating the reproduction performance of the optical disc device.
Figure 13A:
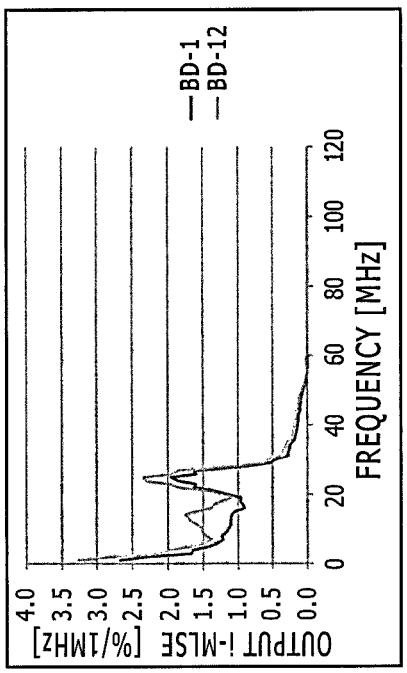
FIG. 13A is an exemplary diagram illustrating a frequency characteristic of the i-MLSE obtained by adding a noise filter of an i-MLSE response to the measurement result of a measurement result of an NSR, intended for BDXL™.
Figure 13B:
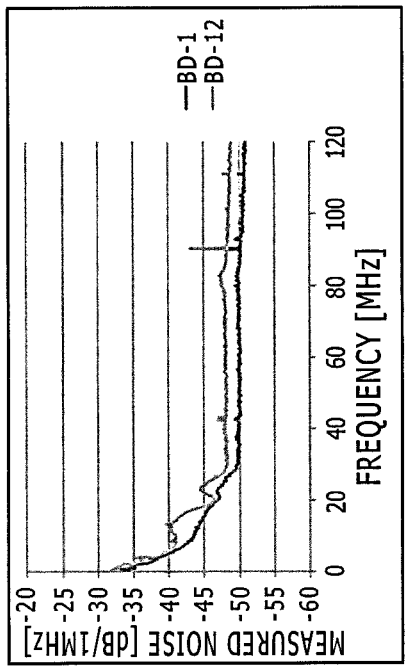
FIG. 13B is an exemplary diagram illustrating a frequency characteristic of the i-MLSE obtained by adding the noise filter of the i-MLSE response to a frequency characteristic of the NSR, intended for BDXL™.
Figure 14:
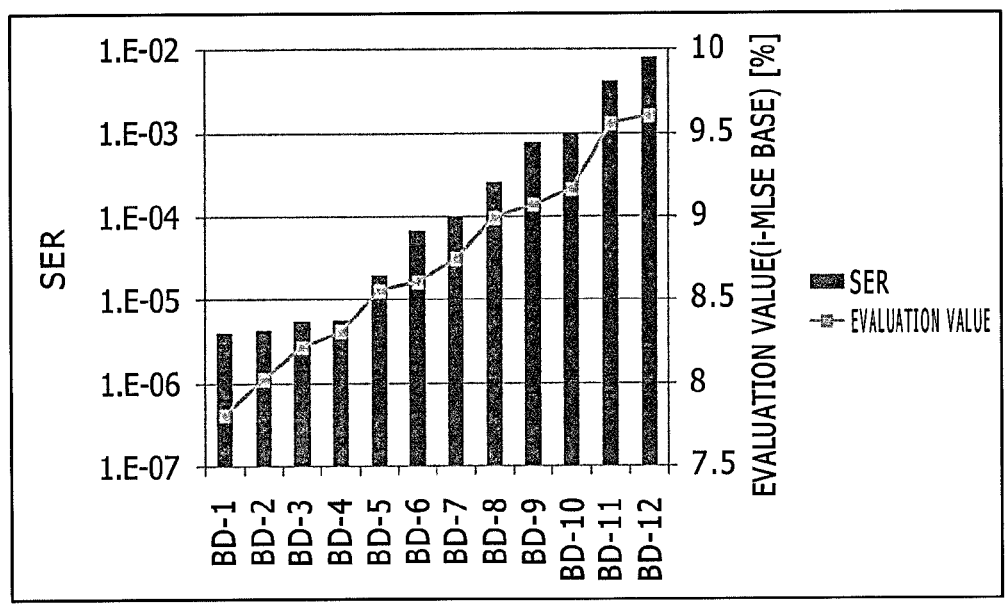
FIG. 14 is an exemplary diagram illustrating evaluated values of the reproduction performance calculated using the SERs of the respective optical disc devices, and the noise filters of the i-MLSE response, intended for BDXL™.

The reproduction performance evaluation in the respective devices of FIG. 11A is conducted in a procedure of FIG. 12. In Step S1001, the noise filters of the respective devices are calculated. In this case, because the noise filters of FIGS. 5A and 7B, which are calculated by simulation are stored in the storage units of the respective devices in advance, this step is omitted. In Step S1002, the signal of a specific pattern is recorded. In this case, the random pattern is recorded as a pattern for signal intensity measurement, and the pattern of FIG. 2A is recorded as the noise measurement signal. In this evaluation, because BDXL™ is targeted, the 2T pure tone signal of the track to be measured is lower than the optical resolution, and the signal amplitude does not occur. Those signals are recorded in the test write region. However, because the reproduction performance can be evaluated in the data region, the evaluation may be conducted in the data region. Alternatively, the signals may be recorded in a given region of the medium as the evaluation pattern in advance. The signals are recorded in the test write region with an advantage that the data region can be effectively used as the region in which the user data is recorded. The signals for the signal intensity measurement are recorded for 1 cluster, and the signals for the noise measurement are recorded about half round of the optical disc. The noise to be measured is more stable as a length for recording the noise measurement signals is longer. However, even when the recording length is as short as about 2 mm, the evaluation can be conducted. In subsequent Step S1003, the signal intensity and the amount of noise are measured. The signal intensity is acquired as the maximum amplitude of the random signal, and the amount of noise is acquired by reproducing the pattern of FIG. 2A, and processing the reproduced signal through the noise calculation unit of the control unit 22. The results of standardizing the amount of noise acquired in devices BD-1 and DB-12 by the signal intensity are illustrated in FIG. 13A. It can be confirmed that the device BD-12 is higher in NSR than the device BD-1. In Step S1004, the evaluated value of the reproduction performance is calculated using the measurement results and the noise filter. In this case, as the noise filter, the i-MLSE response in FIG. 5A is used. The results of adding the noise filter of the i-MLSE response to the frequency characteristic of the ratio (NSR) of the noise to the signal intensity are illustrated in FIG. 13B. It is found that with the addition of the noise filter, noise equal to or more than 50 MHz can be substantially completely ignored. Also, it can be confirmed that a large difference occurs in the generated amount of i-MLSE by emphasizing the noise of 10 to 30 MHz. As a result of calculating the evaluated value of the reproduction performance according to the frequency characteristic of the i-MLSE using Expression 2, the devices BD-1 and BD-12 are 7.7% and 9.6%, respectively. The evaluated values are calculated for all of the devices, and the results of plotting a relationship between the evaluated value and the SER are illustrated in FIG. 14. Since the reproduction performance (SER) measured in advance and the evaluated value in this evaluation uniquely correspond to each other for all of the devices, it can be confirmed that the reproduction performance of the respective devices can be accurately evaluated using the evaluation method of the reproduction performance of the present invention.

In this example, the SER is substantially the same in the devices BD-1 to BD-4 although the reproduction performance is changed. This means that when the reproduction performance of the device becomes equal to or more than that in the device BD-4, the reproduced signal quality is substantially determined by only the signal quality, and not affected by the reproduction performance. That is, this represents that the signal quality used in the SER measurement of the device in FIG. 11A is about 5.6E-6, and the signal quality of 5.6E-6 or lower can be accurately evaluated by the device having the reproduction performance 8.4% or lower in the evaluated value. From the above fact, using the evaluation method of the reproduction performance according to the present invention, it can be also confirmed that the device that can accurately evaluate the signal quality can be selected in the range of the signal quality arbitrarily determined.

For example, the selection of the device in the optical disc device manufacturer is implemented on the above results as follows. When a standard of the reproduction performance of the device is set so that the evaluation medium of the reproduction performance in FIG. 11A can be reproduced in SER≤1.0E-4, it is determined that the device of evaluated value≤9.3% is determined as the specification attainment, and the device of evaluated value>9.3% is determined as the specification non-attainment. Only the specification attainment devices are shipped on the basis of this results whereby the manufacturer can ship only the devices whose set reproduction performance is ensured.

Also, when the devices are selected on the basis of the recording performance, the device selection is implemented as follows. When the recording signal quality of the device is set as SER≤5.6E-6, the signal recorded by the target device is reproduced by the device of the evaluated value≤8.4%. The device used for recording when the reproduced signal quality is SER≤5.6E-6 is determined as the specification attainment, and the device when the reproduced signal quality is SER>5.6E-6 is determined as the specification non-attainment. Only the specification attainment devices are shipped on the basis of this results whereby the manufacturer can ship only the devices whose set recording performance is ensured.

The selection of the devices by the reproduction performance and the recording performance described above is implemented not only before shipment but also as a periodic check of the devices, thereby being capable of suppressing accidental data loss caused by temporal deterioration of the device. For example, the evaluated value of the device is calculated prior to the reproduction of the medium in which data is saved. When SER≤5.6E-6 is assumed as the signal quality of data, from the viewpoint of a fact that the devices having the potential that the reproduction error occurs are excluded, it can be determined that the devices of the evaluated value≤9.5% are reproducible, and the devices of the evaluated value>9.5% are irreproducible. As a result, even if the reproduction performance of the device is deteriorated with time, the device that can reproduce the assumed signal quality can be appropriately selected, and the reproduction error can be eliminated. In this case, when the device is determined to be irreproducible, data in question is reproduced by another device. Also, the same can be implemented on the recording performance, the device having the assumed reproduction performance is determined prior to recording, and used for recording, as a result of which the recording error can be always eliminated. The periodic check can be implemented when conducting the recording reproduction. However, taking a time reduction of the recording/reproduction operation into account, an implementation time can be determined on the basis of a deterioration speed of the device. For example, if it takes 10 years on average to cause the recording/reproduction performance of the device not to arrive at the specification, the check may be implemented every year. Also, the check may not be periodically implemented, but the recording/reproduction may be implemented by the device, and the check may be conducted when the reproduction error occurs. As a result, it can be confirmed whether the reproduction error is caused by the deterioration of the device, or incidentally occurs, and it can be determined whether the device is to be replaced with a fresh one, or not.

Further, for example, when the temporal deterioration of the signal quality of the medium in which the data is saved is confirmed, and the data loss is prevented, the check is implemented as follows. In the case where a standard of the signal quality of the medium is set as SER≤5.6E-6, and data is migrated to a fresh medium if the signal quality is deteriorated lower than the set quality, the device of the evaluated value ≤8.4% is first prepared. The signal quality is periodically checked using the above device, and it is determined that the signal of the medium is deteriorated if SER>5.6E-6 is met, and data on the medium is copied to the fresh medium. As a result, the signal quality of data can be always maintained in an excellent state, and the data loss is eliminated. The above check may be implemented when reproducing the medium. However, when it takes time for the reproduction operation if the check is implemented every time, or a reproduction interval is as long as several years, the signal quality may be too deteriorated, and data may be lost. Under the circumstances, a check time may be determined in advance. For example, if it is known in advance that a lifetime of the medium is 10 years on average, the check may be conducted every year. The method of confirming the signal quality of data, and determining a data migration time is described above. The medium lifetime may be estimated by the above evaluation. For example, the signal quality and the elapsed time are stored using the device of the evaluated value≤8.4% every time the saved data is checked. The lifetime of data is estimated on the basis of a change in the signal quality to the stored elapsed time. For example, a relationship between the elapsed time and a logarithmic value of the SER is subjected to linear approximation, and a time required until the linear approximation arrives at a threshold value (SER≤5.6E-6) of the signal quality is determined. As a result, it can be specified how many years the medium can be used afterward, and the data is migrated to the fresh medium before the medium arrives at the lifetime, thereby being capable of eliminating the data loss. Also, because the medium lifetime is clarified in this technique, the check interval can be determined on the basis of the medium lifetime. That is, if the elapsed time is shorter than the medium lifetime, the periodic check is not implemented. If the elapsed time is close to the lifetime, the periodic check is frequently implemented, and the reproduction operation time by the periodic check can be reduced.

Second Embodiment

In this embodiment, a case in which the noise filter used for calculating the evaluated value of the reproduction performance in the first embodiment is changed will be described. Because parts not changed are identical with those in the first embodiment, those parts will be emitted in this embodiment.

The noise filter used for calculation of the evaluated value of the reproduction performance is not limited to the i-MLSE response, but for example, the transmission characteristic of noise can be used.

Figure 16:
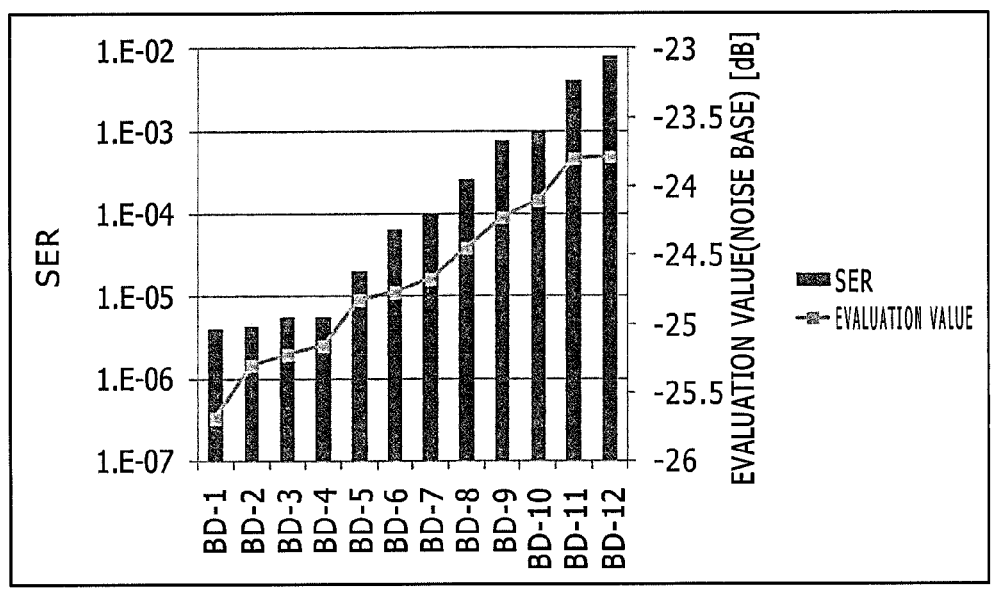
FIG. 16 is an exemplary diagram illustrating evaluation values of the reproduction performance calculated using the SER of the respective optical disc devices and the noise filter of the noise transmission characteristic.

For example, when the transmission characteristic of noise is used for the noise filter, a relationship between the frequency characteristic of the NSR and the results of adding the noise filter to the frequency characteristic of the NSR in the devices BD-1 and BD-12 is illustrated in FIGS. 15A and 15B. The frequency characteristic is different from that in FIG. 13B where the noise filter of the i-MLSE response is used, but identical therewith in that the noise of a high frequency is attenuated, and can be substantially ignored, and in that a noise difference of 10 to 30 MHz is emphasized. As a result of calculating the evaluated value using Expression 3, the evaluated values are −25.8 dB and −23.8 dB in the devices BD-1 and BD-12, respectively. The evaluated values are calculated for all of the devices, and the results of plotting the relationship between the evaluated values and the SER are illustrated in FIG. 16. As in the case of FIG. 14, since the reproduction performances (SER) measured in advance and the evaluated values in this evaluation uniquely correspond to each other for all of the devices, even if the transmission characteristic of noise is used in the noise filter in the method for evaluating the reproduction performance according to the present invention, it can be confirmed that the reproduction performances of the respective devices can be accurately evaluated.

Also, the SER is substantially the same in the devices BD-1 to BD-4 although the reproduction performance is changed as in the first embodiment. From this viewpoint, it is found that the signal quality equal to or lower than 5.6E-6 can be accurately evaluated by the device having the reproduction performance −25.2 dB or lower in the evaluated value. From the above viewpoint, even using the evaluation method of the reproduction performance according to the present invention, it can be also confirmed that the device that can accurately evaluate the signal quality can be selected in the range of the signal quality arbitrarily determined.

In this example, when attention is paid to the devices BD-11 and BD-12, it is found that the reproduced signal quality is different between the devices BD-11 and BD-12 although the evaluated values thereof are substantially equal to each other. This represents that an influence of the noise caused by the reproduced signal processing system on the reproduced signal quality cannot be accurately expressed only by the transmission characteristic of noise, and an evaluation precision of the reproduction performance is slightly degraded. However, in the technique of this embodiment, because the noise filter is simplified as illustrated in FIG. 7B, the calculation of the noise filter in Step S1001 of FIG. 12 is easy. Also, the technique of this embodiment is advantageous in that the amount of data in the noise filter stored in the storage unit is small, and the amount of calculation in calculating the evaluated value is also small. Therefore, whether the transmission characteristic is used for the noise filter, or an index such as the i-MLSE having a more correlation with the reproduced signal quality is used therefor, may be determined according to the performance of the device or the required evaluation precision.

For example the selection of the device in the optical disc device manufacturer is implemented on the basis of the above results as follows. When a standard of the reproduction performance of the device is set so that the evaluation medium of the reproduction performance in FIG. 11A can be reproduced in SER≤1.0E-4, it is determined that the device of evaluated value≤24.8 dB is determined as the specification attainment, and the device of evaluated value>−24.8 dB is determined as the specification non-attainment. Only the specification attainment devices are shipped on the basis of this results whereby the manufacturer can ship only the devices whose set reproduction performance is ensured.

Also, when the devices are selected on the basis of the recording performance, the device selection is implemented as follows. When the recording signal quality of the device is set as SER≤5.6E-6, the signal recorded by the target device is reproduced by the device of the evaluated value≤−25.2 dB. The device used for recording when the reproduced signal quality is SER≤5.6E-6 is determined as the specification attainment, and the device when the reproduced signal quality is SER>5.6E-6 is determined as the specification non-attainment. Only the specification attainment devices are shipped on the basis of this results whereby the manufacturer can ship only the devices whose recording performance is ensured.

The selection of the devices by the reproduction performance and the recording performance described above is implemented not only before shipment but also as a periodic check of the devices, thereby being capable of suppressing accidental data loss caused by temporal deterioration of the device. For example, the evaluated value of the device is calculated prior to the reproduction of the medium in which data is saved. When SER≤5.6E-6 is assumed as the signal quality of data, from the viewpoint of a fact that the devices having the potential that the reproduction error occurs are excluded, it can be determined that the devices of the evaluated value≤−25.2 dB are reproducible, and the devices of the evaluated value>−25.2 dB are irreproducible. As a result, even if the reproduction performance of the device is deteriorated with time, the device that can reproduce the assumed signal quality can be appropriately selected, and the reproduction error can be eliminated. In this case, when the device is determined to be irreproducible, data in question is reproduced by another device. Also, the same can be implemented on the recording performance, the device having the assumed reproduction performance is determined prior to recording, and used for recording, as a result of which the recording error can be always eliminated. The periodic check can be implemented when conducting the recording reproduction. However, taking a time reduction of the recording/reproduction operation into account, an implementation time can be determined on the basis of a deterioration speed of the device. For example, if it takes 10 years on average to cause the recording/reproduction performance of the device not to arrive at the specification, the check may be implemented every year. Also, the check may not be periodically implemented, but the recording/reproduction may be implemented by the device, and the check may be conducted when the reproduction error occurs. As a result, it can be confirmed whether the reproduction error is caused by the deterioration of the device, or incidentally occurs, and it can be determined whether the device is to be replaced with a fresh one, or not.

Further, for example, when the temporal deterioration of the signal quality of the medium in which the data is saved is confirmed, and the data loss is prevented, the check is implemented as follows. In the case where a standard of the signal quality of the medium is set as SER≤5.6E-6, and data is migrated to a fresh medium if the signal quality is deteriorated lower than the set quality, the device of the evaluated value≤−25.2 dB is first prepared. The signal quality is periodically checked using the above device, and it is determined that the signal of the medium is deteriorated if SER>5.6E-6 is met, and data on the medium is copied to the fresh medium. As a result, the signal quality of data can be always maintained in an excellent state, and the data loss is eliminated. The above check may be implemented when reproducing the medium. However, when it takes time for the reproduction operation if the check is implemented every time, or a reproduction interval is as long as several years, the signal quality may be too deteriorated, and data may be lost. Under the circumstances, a check time may be determined in advance. For example, if it is known in advance that a lifetime of the medium is 10 years on average, the check may be conducted every year. The method of confirming the signal quality of data, and determining a data migration time is described above. The medium lifetime may be estimated by the above evaluation. For example, the signal quality and the elapsed time are stored using the device of the evaluated value≤−25.2 dB every time the saved data is checked. The lifetime of data is estimated on the basis of a change in the signal quality to the stored elapsed time. For example, a relationship between the elapsed time and a logarithmic value of the SER is subjected to linear approximation, and a time required until the linear approximation arrives at a threshold value (SER≤5.6E-6) of the signal quality is determined. As a result, it can be specified how many years the medium can be used afterward, and the data is migrated to the fresh medium before the medium arrives at the lifetime, thereby being capable of eliminating the data loss. Also, because the medium lifetime is clarified in this technique, the check interval can be determined on the basis of the medium lifetime. That is, if the elapsed time is shorter than the medium lifetime, the periodic check is not implemented. If the elapsed time is close to the lifetime, the periodic check is frequently implemented, and the reproduction operation time by the periodic check can be reduced.

Third Embodiment

In this embodiment, the BD is targeted, and the results of implementing the evaluation of the reproduction performance for the devices BD-21 to DB-32 in FIG. 11B are illustrated. The details of the procedures common to those of the first embodiment will be omitted in this embodiment.

Figure 17B:
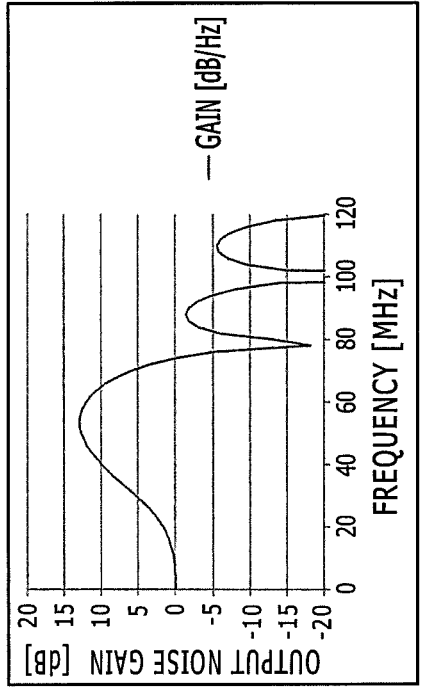
FIG. 17B is an exemplary diagram illustrating the frequency characteristic of the transmission characteristic.
Figure 17A:
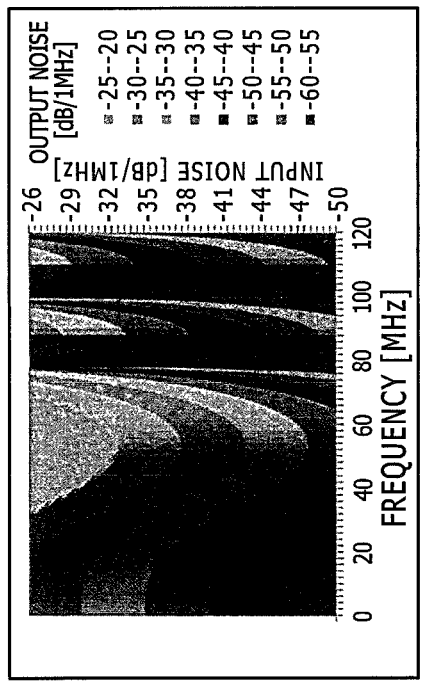
FIG. 17A is an exemplary diagram illustrating the calculation results of the transmission characteristic to the frequency and intensity of the noise intended for the BD.
Figure 19:
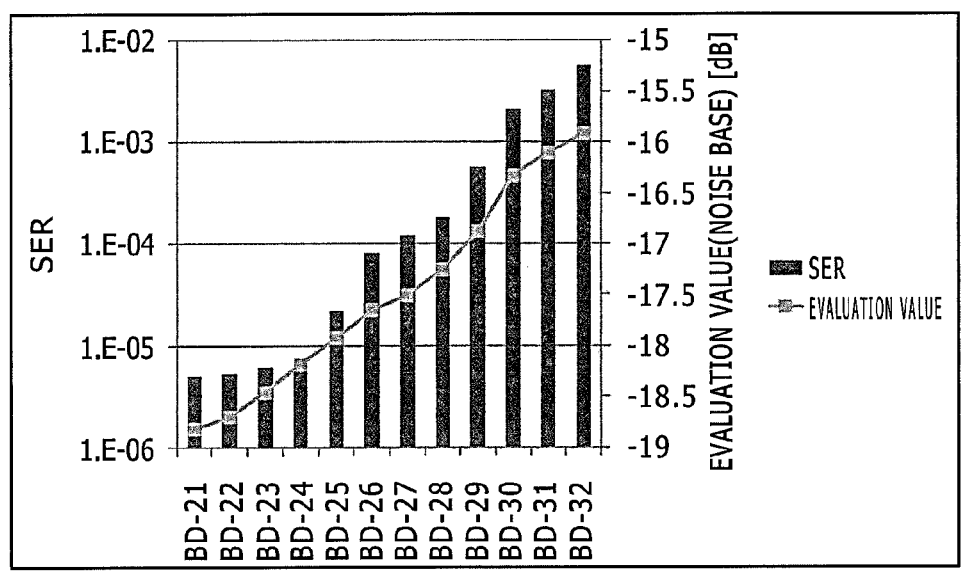
FIG. 19 is an exemplary diagram illustrating evaluated values of the reproduction performance calculated using the SER of the respective optical disc devices, and the noise filter of the noise transmission characteristic.

The reproduction performance evaluation in the respective devices of FIG. 11B is conducted in a procedure of FIG. 12. In Step S1001, the noise filters of the respective devices are calculated. In this case, the transmission characteristic of noise is used as the noise filter. Because the noise filter is calculated, the evaluation signals to which the noise of the various frequencies and intensities is added are output from the control unit 22, the evaluation signals are processed by the various filters used in the reproduced signal processing by the signal processing unit 24, and the noise filter is calculated by the noise calculation unit and the noise filter calculation unit in the control unit 22. The results are illustrated in FIG. 17A, and the results of calculating the frequency characteristic of a gain are illustrated in FIG. 17B. The transmission characteristic in the device BD is different from that in the BDXL™, and has a higher gain on a higher frequency side than the frequency of the 2T pure-tone signal. This is because a limit equalizer is used in the reproduction processing of the device BD, and a high frequency signal is extremely amplified. In Step S1002 of FIG. 12, a signal for signal intensity measurement and a signal for noise measurement are recorded. An 8T pure tone signal is used as the signal for the signal intensity measurement. On the other hand, in the signal for the noise measurement, since the 2T signal of the device BD is equal to or more than the optical resolution, a pattern using the pure tone signal corresponding to 1T is used in the reproduction track in FIG. 2A. In recording, whether a 1T signal is accurately recorded, or not, is not problematic, and the recording is conducted paying attention to facts that the signal amplitude is not observed in the reproduced signal, and an average level matches an average level of the random signal. In subsequent Step S1003, the signal intensity and the amount of noise are measured from the recorded signal. The signal intensity is measured according to the amplitude of the 8T pure tone signal. The amount of noise is measured by processing the reproduced signal through the noise calculation unit of the control unit 22. The results of standardizing the amount of noise acquired in the devices BD-21 and BD-32 by the signal intensity are illustrated in FIG. 18A. It can be confirmed that the device BD-32 is higher in the NSR than the device BD-21 in a region of 10 MHz or higher. In Step S1004, the reproduction performance evaluated value is calculated using the measurement results and the noise filter. The results of adding the noise filter of the transmission characteristic to the frequency characteristic of the NSR are illustrated in FIG. 18B. It is found that with the addition of the noise filter, noise of 70 MHz or higher is substantially ignored, and noise of 30 to 60 MHz is emphasized. As a result of calculating the evaluated value of the reproduction performance using Expression 3, the evaluated values are $-18.9$ dB and $-16.0$ dB in the devices BD-21 and BD-32, respectively. The evaluated values are calculated for all of the devices, and the results of plotting the relationship between the evaluated values and the SER are illustrated in FIG. 19. The reproduction performances (SER) measured in advance and the evaluated values in this evaluation uniquely correspond to each other for all of the devices. From the above results, even if the method for evaluating the reproduction performance according to the present invention is used for the BD, it can be confirmed that the reproduction performances of the respective devices can be accurately evaluated.

Also, the SER is substantially the same in the devices BD-21 to BD-24 although the reproduction performance is changed. This means that the reproduced signal quality is substantially determined according to only the signal quality when the reproduction performance of the device becomes equal to or higher than that of the BD-24, and not affected by the reproduction performance. That is, this represents that the signal quality used for the SER measurement of the device in FIG. 11B is about 6.2E-6, and the signal quality of 6.2E-6 or lower can be accurately evaluated by the device having the reproduction performance $-18.2$ dB or lower in the evaluated value. From the above viewpoint, using the evaluation method of the reproduction performance according to the present invention, it can be also confirmed that the device that can accurately evaluate the signal quality can be selected in the range of the signal quality arbitrarily determined.

In this example, the transmission characteristic of the noise is used as the noise filter in both of the second embodiment and this embodiment. However, a reduction in the evaluation precision of the reproduction performance is not confirmed from the results of this embodiment. This is because the PRML is used for SER calculation of FIG. 11A, but the limit equalizer is used for SER calculation of FIG. 11B. From the above viewpoint, in the method for evaluating the reproduction performance according to the present invention, it can be confirmed that the evaluation precision of the reproduction performance is improved using the noise filter fitted to the reproduction processing system.

On the basis of the above results, for example, the selection of the device in the optical disc device manufacturer is implemented as follows. When a standard of the reproduction performance of the device is set so that the evaluation medium of the reproduction performance in FIG. 11B can be reproduced in SER≤1.0E-3, it is determined that the device of evaluated value≤$-16.5$ dB is determined as the specification attainment, and the device of evaluated value>$-16.5$ dB is determined as the specification non-attainment. Only the specification attainment devices are shipped on the basis of this results whereby the manufacturer can ship only the devices whose set reproduction performance is ensured.

Also, when the devices are selected on the basis of the recording performance, the device selection is implemented as follows. When the recording signal quality of the device is set as SER≤6.2E-6, the signal recorded by the target device is reproduced by the device of the evaluated value≤$-18.5$ dB. The device used for recording when the reproduced signal quality is SER≤6.2E-6 is determined as the specification attainment, and the device when the reproduced signal quality is SER>6.2E-6 is determined as the specification non-attainment. Only the specification attainment devices are shipped on the basis of this results whereby the manufacturer can ship only the devices whose set recording performance is ensured.

The selection of the devices by the reproduction performance and the recording performance described above is implemented not only before shipment but also as a periodic check of the devices, thereby being capable of suppressing accidental data loss caused by temporal deterioration of the device. For example, the evaluated value of the device is calculated prior to the reproduction of the medium in which data is saved. When SER≤6.2E-6 is assumed as the signal quality of data, from the viewpoint of a fact that the devices having the potential that the reproduction error occurs are excluded, it can be determined that the devices of the evaluated value≤$-18.2$ dB are reproducible, and the devices of the evaluated value>−18.2 dB are irreproducible. As a result, even if the reproduction performance of the device is deteriorated with time, the device that can reproduce the assumed signal quality can be appropriately selected, and the reproduction error can be eliminated. In this case, when the device is determined to be irreproducible, data in question is reproduced by another device. Also, the same can be implemented on the recording performance, the device having the assumed reproduction performance is determined prior to recording, and used for recording, as a result of which the recording error can be always eliminated. The periodic check can be implemented when conducting the recording reproduction. However, taking a time reduction of the recording/reproduction operation into account, an implementation time can be determined on the basis of a deterioration speed of the device. For example, if it takes 10 years on average to cause the recording/reproduction performance of the device not to arrive at the specification, the check may be implemented every year. Also, the check may not be periodically implemented, but the recording/reproduction may be implemented by the device, and the check may be conducted when the reproduction error occurs. As a result, it can be confirmed whether the reproduction error is caused by the deterioration of the device, or incidentally occurs, and it can be determined whether the device is to be replaced with a fresh one, or not.

Further, for example, when the temporal deterioration of the signal quality of the medium in which the data is saved is confirmed, and the data loss is prevented, the check is implemented as follows. In the case where a standard of the signal quality of the medium is set as SER≤6.2E-6, and data is migrated to a fresh medium if the signal quality is deteriorated lower than the set quality, the device of the evaluated value≤−18.2 dB is first prepared. The signal quality is periodically checked using the above device, and it is determined that the signal of the medium is deteriorated if SER>6.2E-6 is met, and data on the medium is copied to the fresh medium. As a result, the signal quality of data can be always maintained in an excellent state, and the data loss is eliminated. The above check may be implemented when reproducing the medium. However, when it takes time for the reproduction operation if the check is implemented every time, or a reproduction interval is as long as several years, the signal quality may be too deteriorated, and data may be lost. Under the circumstances, a check time may be determined in advance. For example, if it is known in advance that a lifetime of the medium is 10 years on average, the check may be conducted every year. The method of confirming the signal quality of data, and determining a data migration time is described above. The medium lifetime may be estimated by the above evaluation. For example, the signal quality and the elapsed time are stored using the device of the evaluated value≤−18.2 dB every time the saved data is checked. The lifetime of data is estimated on the basis of a change in the signal quality to the stored elapsed time. For example, a relationship between the elapsed time and a logarithmic value of the SER is subjected to linear approximation, and a time required until the linear approximation arrives at a threshold value (SER≤6.2E-6) of the signal quality is determined. As a result, it can be specified how many years the medium can be used afterward, and the data is migrated to the fresh medium before the medium arrives at the lifetime, thereby being capable of eliminating the data loss. Also, because the medium lifetime is clarified in this technique, the check interval can be determined on the basis of the medium lifetime. That is, if the elapsed time is shorter than the medium lifetime, the periodic check is not implemented. If the elapsed time is close to the lifetime, the periodic check is frequently implemented, and the reproduction operation time by the periodic check can be reduced.

Fourth Embodiment

In this embodiment, the DVD is targeted, and the results of implementing the evaluation of the reproduction performance for the devices DVD-1 to DVD-12 in FIG. 11C are illustrated. The details of the procedures common to those of the first embodiment will be omitted in this embodiment.

Figure 20B:
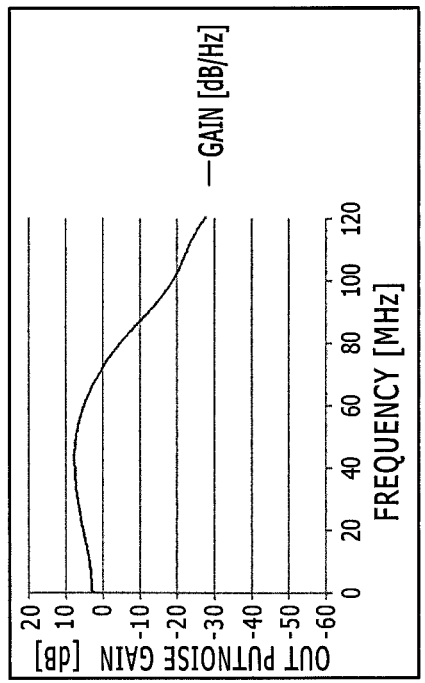
FIG. 20B is an exemplary diagram illustrating the frequency characteristic of the transmission characteristic.
Figure 20A:
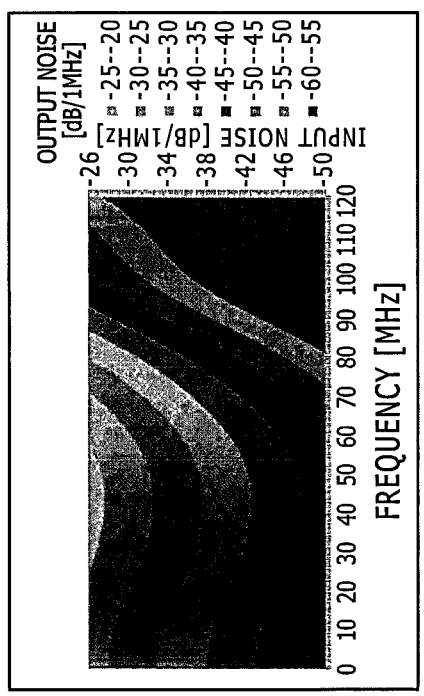
FIG. 20A is an exemplary diagram illustrating the calculation results of the transmission characteristic to the frequency and intensity of the noise intended for the DVD.
Figure 21A:
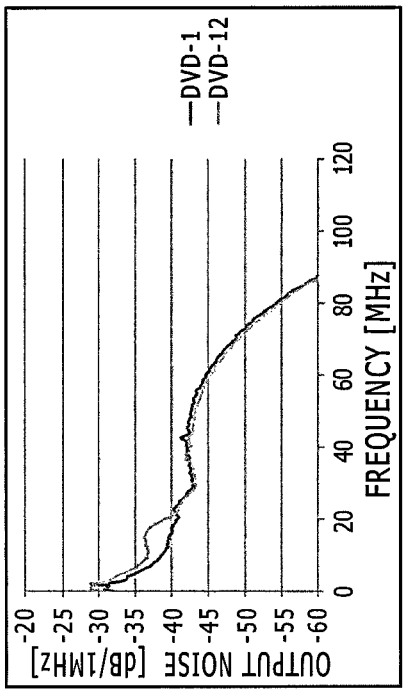
FIG. 21A is an exemplary diagram illustrating the frequency characteristic of the noise obtained by adding the noise filter of the noise transmission characteristic to the measurement results of the NSR, intended for the DVD.
Figure 21B:
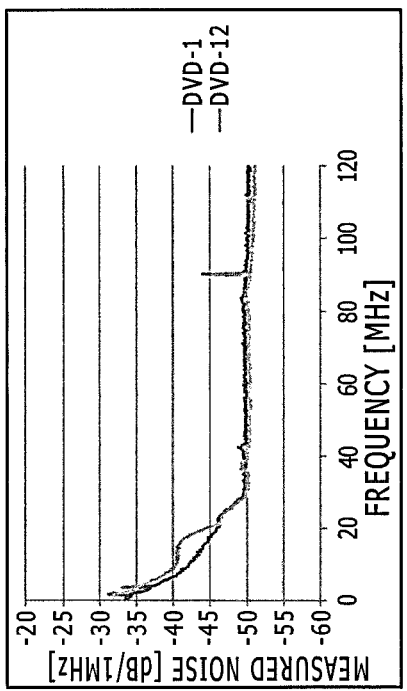
FIG. 21B is an exemplary diagram illustrating the frequency characteristic of the noise obtained by adding the noise filter of the noise transmission characteristic to the frequency characteristics of the NSR, intended for the DVD.
Figure 22:
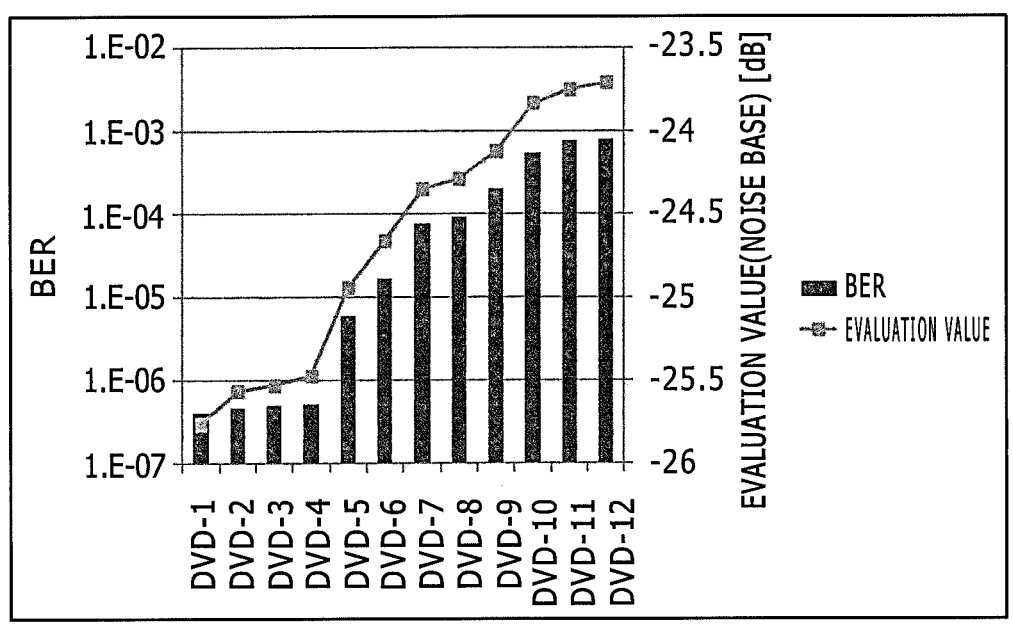
FIG. 22 is an exemplary diagram illustrating evaluated values of the reproduction performance calculated using the BER of the respective optical disc devices, and the noise filter of the noise transmission characteristic.

The reproduction performance evaluation in the respective devices of FIG. 11C is conducted in a procedure of FIG. 12. In Step S1001, the noise filters of the respective devices are calculated. In this case, the transmission characteristic of noise is used as the noise filter. Because the noise filter is calculated, white noise is output from the control unit 22, and the input signal is processed in the various filters used for the reproduction signal processing in the control unit 22. The results are illustrated in FIG. 20A, and the results of calculating the frequency characteristic of the gain are illustrated in FIG. 20B. In Step S1002 of FIG. 12, a signal for signal intensity measurement and a signal for noise measurement are recorded. The random pattern is recorded as the signal for the signal intensity measurement as in the first embodiment. On the other hand, the pattern illustrated in FIG. 2B is used as the signal for the noise measurement. In recording, a DC recording signal of the reproduction track is adjusted so that the signal level of the reproduced signal matches an average level in the random signal. In subsequent Step S1003, the signal intensity and the amount of noise are measured from the recorded signal. The signal intensity is acquired as the maximum amplitude of the random signal, and the amount of noise is acquired by reproducing the recorded pattern of FIG. 2B, and processing the reproduced signal through the noise calculation unit of the control unit 22. The results standardized by the amount of noise acquired in the DVD-1 and DVD-12, and the signal intensity are illustrated in FIG. 21A. It can be confirmed that the DVD-12 is higher in NSR of 10 to 20 MHz than the DVD-1. In Step S1004, the evaluated value of the reproduction performance is calculated using the measurement results and the noise filter. The results of adding the noise filter of the transmission characteristic to the frequency characteristic of NSR are illustrated in FIG. 21B. If is found that with the addition of the noise filter, the noise of 60 MHz or higher can be substantially ignored. As a result of calculating the evaluated value of the reproduction performance using Expression 3, the evaluated values are −25.8 dB and −23.8 dB in the DVD-1 and DVD-12, respectively. The evaluated values are calculated for all of the devices, and the results of plotting the relationship between the evaluated values and the BER are illustrated in FIG. 22. The reproduction performances (SER) measured in advance and the evaluated values in this evaluation uniquely correspond to each other for all of the devices. From the above results, even if the method for evaluating the reproduction performance according to the present invention is used for the DVD, it can be confirmed that the reproduction performances of the respective devices can be accurately evaluated.

Also, the BER is substantially the same in the DVD-1 to DVD-4 although the reproduction performance is changed. This means that the reproduced signal quality is substantially determined according to only the signal quality when the reproduction performance of the device becomes equal to or higher than the DVD-4, and not affected by the reproduction performance. That is, this represents that the signal quality used for the BER measurement of the device in FIG. 11C is about 5.1E-7, and the signal quality of 5.7E-7 or lower can be accurately evaluated by the device having the reproduction performance −25.5 dB or lower in the evaluated value. From the above viewpoint, using the evaluation method of the reproduction performance according to the present invention, it can be also confirmed that the device that can accurately evaluate the signal quality can be selected in the range of the signal quality arbitrarily determined.

On the basis of the above results, for example, the selection of the device in the optical disc device manufacturer is implemented as follows. When a standard of the reproduction performance of the device is set so that the evaluation medium of the reproduction performance in FIG. 11B can be reproduced in BER≤5.0E-3, it is determined that the device of evaluated value≤−24.0 dB is determined as the specification attainment, and the device of evaluated value>−24.0 dB is determined as the specification non-attainment. Only the specification attainment devices are shipped on the basis of this results whereby the manufacturer can ship only the devices whose set reproduction performance is ensured.

Also, when the devices are selected on the basis of the recording performance, the device selection is implemented as follows. When the recording signal quality of the device is set as BER≤5.7E-7, the signal recorded by the target device is reproduced by the device of the evaluated value≤−25.5 dB. The device used for recording when the reproduced signal quality is BER≤5.7E-7 is determined as the specification attainment, and the device when the reproduced signal quality is BER>5.7E-7 is determined as the specification non-attainment. Only the specification attainment devices are shipped on the basis of this results whereby the manufacturer can ship only the devices whose set recording performance is ensured.

The selection of the devices by the reproduction performance and the recording performance described above is implemented not only before shipment but also as a periodic check of the devices, thereby being capable of suppressing accidental data loss caused by temporal deterioration of the device. For example, the evaluated value of the device is calculated prior to the reproduction of the medium in which data is saved. When BER≤5.7E-7 is assumed as the signal quality of data, from the viewpoint of a fact that the devices having the potential that the reproduction error occurs are excluded, it can be determined that the devices of the evaluated value≤−25.5 dB are reproducible, and the devices of the evaluated value>−25.5 dB are irreproducible. As a result, even if the reproduction performance of the device is deteriorated with time, the device that can reproduce the assumed signal quality can be appropriately selected, and the reproduction error can be eliminated. In this case, when the device is determined to be irreproducible, data in question is reproduced by another device. Also, the same can be implemented on the recording performance, the device having the assumed reproduction performance is determined prior to recording, and used for recording, as a result of which the recording error can be always eliminated. The periodic check can be implemented when conducting the recording reproduction. However, taking a time reduction of the recording/reproduction operation into account, an implementation time can be determined on the basis of a deterioration speed of the device. For example, if it takes 10 years on average to cause the recording/reproduction performance of the device not to arrive at the specification, the check may be implemented every year. Also, the check may not be periodically implemented, but the recording/reproduction may be implemented by the device, and the check may be conducted when the reproduction error occurs. As a result, it can be confirmed whether the reproduction error is caused by the deterioration of the device, or incidentally occurs, and it can be determined whether the device is to be replaced with a fresh one, or not.

Further, for example, when the temporal deterioration of the signal quality of the medium in which the data is saved is confirmed, and the data loss is prevented, the check is implemented as follows. In the case where a standard of the signal quality of the medium is set as BER≤6.2E-6, and data is migrated to a fresh medium if the signal quality is deteriorated lower than the set quality, the device of the evaluated value≤−25.5 dB is first prepared. The signal quality is periodically checked using the above device, and it is determined that the signal of the medium is deteriorated if BER>5.7E-7 is met, and data on the medium is copied to the fresh medium. As a result, the signal quality of data can be always maintained in an excellent state, and the data loss is eliminated. The above check may be implemented when reproducing the medium. However, when it takes time for the reproduction operation if the check is implemented every time, or a reproduction interval is as long as several years, the signal quality may be too deteriorated, and data may be lost. Under the circumstances, a check time may be determined in advance. For example, if it is known in advance that a lifetime of the medium is 10 years on average, the check may be conducted every year. The method of confirming the signal quality of data, and determining a data migration time is described above. The medium lifetime may be estimated by the above evaluation. For example, the signal quality and the elapsed time are stored using the device of the evaluated value≤−25.5 dB every time the saved data is checked. The lifetime of data is estimated on the basis of a change in the signal quality to the stored elapsed time. For example, a relationship between the elapsed time and a logarithmic value of the BER is subjected to linear approximation, and a time required until the linear approximation arrives at a threshold value (BER≤5.7E-7) of the signal quality is determined. As a result, it can be specified how many years the medium can be used afterward, and the data is migrated to the fresh medium before the medium arrives at the lifetime, thereby being capable of eliminating the data loss. Also, because the medium lifetime is clarified in this technique, the check interval can be determined on the basis of the medium lifetime. That is, if the elapsed time is shorter than the medium lifetime, the periodic check is not implemented. If the elapsed time is close to the lifetime, the periodic check is frequently implemented, and the reproduction operation time by the periodic check can be reduced.

Fifth Embodiment

In this embodiment, the BD is targeted, and the results of implementing the evaluation of the reproduction performance for the device BD-1 in FIG. 11A, and implementing the reproduction on the basis of the evaluation results are illustrated. Also, the results of evaluating the signal quality of the medium, and determining data migration on the basis of the evaluation results are also illustrated. The details of the procedures common to those of the first embodiment will be omitted in this embodiment. In the evaluation of the reproduction performance, a threshold value of the reproduction performance can be configured to correctly evaluate the signal quality of SER≤5.0E-4, and a standard of the evaluated value is set to 8.7% or lower. Also, a standard of the data migration of the medium is set to the signal quality≤1.0E-3. As the medium, a medium that has recorded data by another device, and then elapsed 2 years is used.

Prior to the reproduction of the medium, the evaluation of the reproduction performance of the device BD-1 is implemented. The evaluation is conducted according to a procedure of FIG. 12, and in Step S1001, the noise filter is calculated. In this case, a response function of the i-MLSE is used as the noise filter. In order to calculate the i-MLSE response function, an evaluation signal to which noise of various frequencies and intensities is added is output from the control unit 22, the reproduced signal processing is implemented by the signal processing unit 24, and the noise filter is calculated by the noise filter calculation unit of the control unit 22. As a result, the same noise filter as that of FIG. 5 is acquired. In Step S1002, a signal of a specific pattern is recorded. In this case, the random pattern is recorded as a pattern for signal intensity measurement, and the pattern of FIG. 2A is recorded as the noise measurement signal. In this evaluation, because BDXL™ is targeted, the 2T pure tone signal of the track to be measured is equal to or lower than the optical resolution, and the signal amplitude does not occur. Those signals are recorded in the test write region. The signals for the signal intensity measurement are recorded for 1 cluster, and the signals for the noise measurement are recorded about half round of the optical disc. The noise to be measured is more stable as a length for recording the noise measurement signals is longer. However, even when the recording length is shorter, the evaluation can be conducted. In subsequent Step S1003, the signal intensity and the amount of noise are measured. The signal intensity is acquired as the maximum amplitude of the random signal, and the amount of noise is acquired by reproducing the pattern of FIG. 3A, and processing the reproduced signal through the noise calculation unit of the control unit 22. The results of standardizing the amount of noise acquired in devices BD-1 and DB-12 by the signal intensity are illustrated in FIG. 13A. In Step S1004, the evaluated value of the reproduction performance is calculated using the frequency characteristic of the ratio of the noise to the signal intensity, and the noise filter. As a result of adding the noise filter of the i-MLSE response to the frequency characteristic of the ratio of the noise to the signal intensity, and integrating the frequency characteristic of the generated amount of i-MLSE in Expression 2 to calculate the evaluated value, the evaluated value is 7.7%. As a result of determining whether this device can be used for reproduction, or not, on the basis of the above results, 7.7%≤the standard value (8.7%) of the reproduction performance is satisfied. Therefore, it is determined that this device can be used for reproduction. Under the circumstances, as a result of reproducing the data on the medium using this device, in the signal quality, the SER of the overall medium is equal to or lower than 2.4E-3, and data can be normally read. As a result, using the method for evaluating this reproduction performance, it can be confirmed that the reproduced signal quality can be excellently kept, and data can be read.

Subsequently, whether the data on the medium is migrated, or not, is determined. First, as a result of confirming a range of the signal quality that can be evaluated by the reproduction device in question, because the evaluated value is 7.7%, the device can accurately evaluate the signal quality of at least SER≤5.6E-6 from the result of the first embodiment. In this case, because a standard of the signal quality in the data migration determination is SER≤1.0E-3, the signal quality which is the determination standard can be accurately evaluated using the device in question. In this example, as described above, as a result of reproducing the medium using the device as described above, the SER on the overall surface of the medium is equal to or lower than 2.4E-3. Therefore, the signal quality of the medium in question is determined as SER≤2.4E-3. As a result of determining whether data migration is conducted, or not, on the basis of the results, the SER which is the signal quality of the medium in question is 2.4E-3≥threshold value (1.0E-3) of the data migration determination, and it is determined that the data on the medium immediately needs to be migrated to the fresh medium. Under the circumstance, the data is again recorded on the new medium using the device. As a result of migrating data, the signal quality of the fresh medium is SER≤1.0E-5 on the overall surface of the medium, and it is determined that the data can be saved on the fresh medium. As a result, using the method for evaluating this reproduction performance, the deterioration of the signal quality of the medium can be appropriately detected, and the data is migrated on the basis of the detection result whereby it can be confirmed that user data can be prevented from being lost.

What is claimed is:
1. A method for evaluating an information reproduction performance, comprising:
    reproducing a recording signal of a given pattern by irradiating a recording medium with a light, and measuring a reproduced signal noise;
    calculating a frequency characteristic related to the reproduced signal noise using a value obtained by standardizing the reproduced signal noise by a signal intensity;
    calculating an evaluated value on the basis of the frequency characteristic; and
    evaluating reproduction performance using the evaluated value.
2. The evaluation method according to claim 1,
    wherein a region in which the given pattern is recorded is a test writing region of the recording medium.
3. The evaluation method according to claim 1,
    wherein the given pattern is a repetitive pattern having a signal length lower than an optical resolution in which a random signal is recorded on an adjacent track.
4. The evaluation method according to claim 1,
    wherein the given pattern is a pattern in which a linear recording mark is recorded where a random signal is recorded on an adjacent track.
5. The evaluation method according to claim 1,
    wherein a random signal for measurement of the signal intensity is included in the recording signal of the given pattern.
6. The evaluation method according to claim 1,
    wherein a repetitive pattern signal of marks having an 8T signal length and spaces is included in the recording signal of the given pattern.
7. A method for evaluating an information reproduction performance, comprising:
    reproducing a recording signal of a given pattern by irradiating a recording medium with a light, and measuring a reproduced signal noise;
    calculating a frequency characteristic related to the reproduced signal noise;
    calculating an evaluated value on the basis of the frequency characteristic, including:
        calculating an amount of i-MLSE generated in respective frequencies by allowing a given filter to act on the frequency characteristic, and
        calculating a square root of a sum of square values of the i-MLSE amount of the respective frequencies; and
    evaluating reproduction performance using the evaluated value.
8. A method for evaluating an information reproduction performance, comprising:
    reproducing a recording signal of a given pattern by irradiating a recording medium with a light, and measuring a reproduced signal noise;

calculating a frequency characteristic related to the reproduced signal noise;
calculating an evaluated value on the basis of the frequency characteristic, including:
  calculating the noise of the respective frequencies by allowing a given filter to act on the frequency characteristic, and
  calculating a sum of the intensities of the noise of the respective frequencies; and
evaluating reproduction performance using the evaluated value.

9. The evaluation method according to claim 7,
wherein the given filter adds the noise of the respective frequencies and intensities to the reproduced signal to generate an evaluation signal, and
wherein the i-MLSE amount generated by the noise of the respective frequencies and intensities is calculated as a square root of a difference of the reproduced signal and the square value of the i-MLSE of the evaluation signal.

10. The evaluation method according to claim 8,
wherein the given filter is a variation of the intensities of the respective frequencies by the transmission characteristic of a reproduced signal processing system.

11. An information reproduction device, comprising:
an optical pickup unit having an optical system for irradiating a recording medium with a light;
a signal processing unit that processes a reproduced signal output from the optical pickup unit; and
a control unit including a noise calculation unit that calculates a frequency characteristic related to a reproduced signal noise on the basis of a signal from the signal processing unit, a reproduction performance evaluation unit that calculates an evaluation index on the basis of the frequency characteristic, and a noise filter calculation unit that adds noise of respective frequencies and intensities to the reproduced signal to generate an evaluation signal and calculate a variation of the reproduced signal and the evaluation signal.

12. The information reproduction device according to claim 11,
wherein the noise calculation unit calculates the frequency characteristic from a noise transmission characteristic in the signal processing unit.

* * * * *